United States Patent
Pandey et al.

(10) Patent No.: US 10,552,248 B2
(45) Date of Patent: *Feb. 4, 2020

(54) COMPUTER SYSTEM AND METHOD OF DETECTING MANUFACTURING NETWORK ANOMALIES

(71) Applicant: Uptake Technologies, Inc., Chicago, IL (US)

(72) Inventors: Aparna Pandey, Chicago, IL (US); Nelson Troy de Freitas, Chicago, IL (US)

(73) Assignee: Uptake Technologies, Inc., Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/194,027

(22) Filed: Nov. 16, 2018

(65) Prior Publication Data
US 2019/0272207 A1    Sep. 5, 2019

Related U.S. Application Data

(63) Continuation of application No. 15/910,920, filed on Mar. 2, 2018, now Pat. No. 10,169,135.

(51) Int. Cl.
G08B 21/00    (2006.01)
G06F 11/07    (2006.01)
G05B 23/02    (2006.01)

(52) U.S. Cl.
CPC ........ G06F 11/079 (2013.01); G05B 23/0267 (2013.01); G05B 23/0283 (2013.01); G06F 11/0709 (2013.01); G06F 2201/81 (2013.01)

(58) Field of Classification Search
CPC .................................................. G06F 11/079
(Continued)

(56) References Cited

U.S. PATENT DOCUMENTS 5,566,092 A    10/1996    Wang et al.
5,633,800 A     5/1997    Bankert et al.
(Continued)

FOREIGN PATENT DOCUMENTS

WO    2011117570    9/2011
WO    2013034420    3/2013
(Continued)

OTHER PUBLICATIONS

Biswas, Trisha. Redundancy-based Approaches in Wireless Multihop Network Design. PhD Dissertation Submitted to Graduate Faculty of North Carolina State University, Raleigh, North Carolina, Mar. 25, 2014, pp. 1-141 [online], [retrieved on May 26, 2015]. Retrieved from the Internet <URL:https://repository.lib.ncsu.edu/bitstream/handle/1840.16/9313/etd.pdf?sequence=2&isAllowed=y>.

(Continued)

*Primary Examiner* — Tai T Nguyen
(74) *Attorney, Agent, or Firm* — Lee Sullivan Shea & Smith LLP

(57)    ABSTRACT

A computing system may evaluate the operation of a manufacturing network using at least two of (a) macro-level threshold criteria indicating anomalous operation of the manufacturing network as a whole, (b) micro-level threshold criteria indicating anomalous operation of any of a plurality of micro-networks in the manufacturing network, (c) path-level threshold criteria indicating anomalous operation of any of a plurality of node paths in the manufacturing network, or (d) node-level threshold criteria indicating anomalous operation of any of a plurality of individual nodes in the manufacturing network. Based on the evaluating, computing system may identify at least one anomaly in the manufacturing network and then trigger at least one action that is directed to resolving the at least one anomaly.

20 Claims, 7 Drawing Sheets

(58) Field of Classification Search
USPC ...... 340/540, 541, 517, 521, 660, 10, 10.32,
340/56.7; 706/45–47, 53, 62; 714/26,
714/27, 43, 56
See application file for complete search history.

(56) References Cited

U.S. PATENT DOCUMENTS

| | | | |
|---|---|---|---|
| 6,256,594 B1 | 7/2001 | Yamamoto et al. |
| 6,336,065 B1 | 1/2002 | Gibson et al. |
| 6,442,542 B1 | 8/2002 | Ramani et al. |
| 6,473,659 B1 | 10/2002 | Shah et al. |
| 6,622,264 B1 | 9/2003 | Bliley et al. |
| 6,634,000 B1 | 10/2003 | Jammu et al. |
| 6,643,600 B2 | 11/2003 | Yanosik et al. |
| 6,650,949 B1 | 11/2003 | Fera et al. |
| 6,725,398 B1 | 4/2004 | Varma et al. |
| 6,760,631 B1 | 7/2004 | Berkowitz et al. |
| 6,775,641 B2 | 8/2004 | Wegerich et al. |
| 6,799,154 B1 | 9/2004 | Aragones et al. |
| 6,823,253 B2 | 11/2004 | Brunell |
| 6,859,739 B2 | 2/2005 | Wegerich et al. |
| 6,892,163 B1 | 5/2005 | Herzog et al. |
| 6,947,797 B2 | 9/2005 | Dean et al. |
| 6,952,662 B2 | 10/2005 | Wegerich et al. |
| 6,957,172 B2 | 10/2005 | Wegerich |
| 6,975,962 B2 | 12/2005 | Wegerich et al. |
| 7,020,595 B1 | 3/2006 | Adibhatla et al. |
| 7,062,683 B2 * | 6/2006 | Warpenburg | G06F 11/0718 714/27 |
| 7,082,379 B1 | 7/2006 | Bickford et al. |
| 7,100,084 B2 | 8/2006 | Unkle et al. |
| 7,107,491 B2 | 9/2006 | Graichen et al. |
| 7,127,371 B2 | 10/2006 | Duckert et al. |
| 7,233,886 B2 | 6/2007 | Wegerich et al. |
| 7,246,156 B2 * | 7/2007 | Ginter | G06F 21/55 709/217 |
| 7,280,941 B2 | 10/2007 | Bonanni et al. |
| 7,308,385 B2 | 12/2007 | Wegerich et al. |
| 7,373,283 B2 | 5/2008 | Herzog et al. |
| 7,403,869 B2 | 7/2008 | Wegerich et al. |
| 7,409,320 B2 | 8/2008 | Wegerich |
| 7,415,382 B1 | 8/2008 | Bickford et al. |
| 7,428,478 B2 | 9/2008 | Aragones |
| 7,447,666 B2 | 11/2008 | Wang |
| 7,457,693 B2 | 11/2008 | Olsen et al. |
| 7,457,732 B2 | 11/2008 | Aragones et al. |
| 7,509,235 B2 | 3/2009 | Bonissone et al. |
| 7,536,364 B2 | 5/2009 | Subbu et al. |
| 7,539,597 B2 | 5/2009 | Wegerich et al. |
| 7,548,830 B2 | 6/2009 | Goebel et al. |
| 7,634,384 B2 | 12/2009 | Eryurek et al. |
| 7,640,145 B2 | 12/2009 | Wegerich et al. |
| 7,660,705 B1 | 2/2010 | Meek et al. |
| 7,725,293 B2 | 5/2010 | Bonissone et al. |
| 7,739,096 B2 | 6/2010 | Wegerich et al. |
| 7,756,678 B2 | 7/2010 | Bonissone et al. |
| 7,792,770 B1 | 9/2010 | Phoha et al. |
| 7,793,138 B2 | 9/2010 | Rastogi et al. |
| 7,822,578 B2 | 10/2010 | Kasztenny et al. |
| 7,869,908 B2 | 1/2011 | Walker |
| 7,919,940 B2 | 4/2011 | Miller et al. |
| 7,941,701 B2 | 5/2011 | Wegerich et al. |
| 7,962,240 B2 | 6/2011 | Morrison et al. |
| 8,024,069 B2 | 9/2011 | Miller et al. |
| 8,050,800 B2 | 11/2011 | Miller et al. |
| 8,145,578 B2 | 3/2012 | Pershing et al. |
| 8,229,769 B1 | 7/2012 | Hopkins |
| 8,234,420 B2 | 7/2012 | Lueckenbach et al. |
| 8,239,170 B2 | 8/2012 | Wegerich |
| 8,275,577 B2 | 9/2012 | Herzog |
| 8,285,402 B2 | 10/2012 | Lueckenbach et al. |
| 8,311,774 B2 | 11/2012 | Hines |
| 8,352,216 B2 | 1/2013 | Subbu et al. |
| 8,532,795 B2 | 9/2013 | Adavi et al. |
| 8,533,018 B2 | 9/2013 | Miwa et al. |
| 8,560,494 B1 | 10/2013 | Downing et al. |
| 8,620,618 B2 | 12/2013 | Eryurek et al. |
| 8,620,853 B2 | 12/2013 | Herzog |
| 8,626,385 B2 | 1/2014 | Humphrey |
| 8,645,276 B2 | 2/2014 | Wong et al. |
| 8,660,980 B2 | 2/2014 | Herzog |
| 8,689,108 B1 | 4/2014 | Duffield et al. |
| 8,713,467 B1 | 4/2014 | Goldenberg et al. |
| 8,786,605 B1 | 7/2014 | Curtis et al. |
| 8,799,799 B1 | 8/2014 | Cervelli et al. |
| 8,812,960 B1 | 8/2014 | Sun et al. |
| 8,832,594 B1 | 9/2014 | Thompson et al. |
| 8,850,000 B2 | 9/2014 | Collins et al. |
| 8,862,938 B2 | 10/2014 | Souvannarath |
| 8,868,537 B1 | 10/2014 | Colgrove et al. |
| 8,886,601 B1 | 11/2014 | Landau et al. |
| 8,909,656 B2 | 12/2014 | Kumar et al. |
| 8,917,274 B2 | 12/2014 | Ma et al. |
| 8,918,246 B2 | 12/2014 | Friend |
| 8,924,429 B1 | 12/2014 | Fisher et al. |
| 8,934,352 B2 | 1/2015 | Pei et al. |
| 8,935,201 B1 | 1/2015 | Fisher et al. |
| 8,937,619 B2 | 1/2015 | Sharma et al. |
| 8,938,686 B1 | 1/2015 | Erenrich et al. |
| 8,943,367 B2 | 1/2015 | Jiang et al. |
| 2002/0091972 A1 | 7/2002 | Harris et al. |
| 2002/0152056 A1 | 10/2002 | Herzog et al. |
| 2003/0055666 A1 | 3/2003 | Roddy et al. |
| 2003/0126258 A1 | 7/2003 | Conkright et al. |
| 2004/0181712 A1 | 9/2004 | Taniguchi et al. |
| 2004/0243636 A1 | 12/2004 | Hasiewicz et al. |
| 2005/0119905 A1 | 6/2005 | Wong et al. |
| 2005/0222747 A1 | 10/2005 | Vhora et al. |
| 2005/0289219 A1 | 12/2005 | Nazzal |
| 2006/0287842 A1 | 12/2006 | Kim |
| 2007/0192128 A1 * | 8/2007 | Celestini | G06Q 40/00 705/35 |
| 2007/0263628 A1 | 11/2007 | Axelsson et al. |
| 2008/0059080 A1 | 3/2008 | Greiner et al. |
| 2008/0059120 A1 | 3/2008 | Xiao et al. |
| 2008/0250497 A1 | 10/2008 | Mullarkey et al. |
| 2012/0271612 A1 | 10/2012 | Barsoum et al. |
| 2012/0310597 A1 | 12/2012 | Uchiyama et al. |
| 2013/0010610 A1 | 1/2013 | Karthikeyan et al. |
| 2013/0024416 A1 | 1/2013 | Herzog |
| 2013/0283773 A1 | 10/2013 | Hague |
| 2013/0325502 A1 | 12/2013 | Robicsek et al. |
| 2014/0012886 A1 | 1/2014 | Downing et al. |
| 2014/0032132 A1 | 1/2014 | Stratton et al. |
| 2014/0060030 A1 | 3/2014 | Ma et al. |
| 2014/0089035 A1 | 3/2014 | Jericho et al. |
| 2014/0105481 A1 | 4/2014 | Hasselbusch et al. |
| 2014/0121868 A1 | 5/2014 | Zhang et al. |
| 2014/0169398 A1 | 6/2014 | Arndt et al. |
| 2014/0170617 A1 | 6/2014 | Johnson et al. |
| 2014/0184643 A1 | 7/2014 | Friend |
| 2014/0222355 A1 | 8/2014 | Cheim et al. |
| 2014/0327573 A1 | 11/2014 | Leibner et al. |
| 2014/0330600 A1 | 11/2014 | Candas et al. |
| 2014/0330749 A1 | 11/2014 | Candas et al. |
| 2014/0351642 A1 | 11/2014 | Bates et al. |
| 2014/0357295 A1 | 12/2014 | Skomra et al. |
| 2014/0358601 A1 | 12/2014 | Smiley et al. |
| 2015/0046870 A1 | 2/2015 | Goldenberg et al. |
| 2015/0195296 A1 | 7/2015 | Vasseur et al. |
| 2015/0262060 A1 | 9/2015 | Husain et al. |
| 2016/0154690 A1 | 6/2016 | Horrell et al. |
| 2016/0261482 A1 | 9/2016 | Mixer et al. |
| 2017/0214706 A1 | 7/2017 | Wittenschlaeger |

(56) References Cited

U.S. PATENT DOCUMENTS

2019/0064787 A1 2/2019 Maturana
2019/0130659 A1 5/2019 Ide et al.

FOREIGN PATENT DOCUMENTS

WO 2014145977 9/2014
WO 2014205497 12/2014

OTHER PUBLICATIONS

Isermann, Rolf. Model-based Fault Detection and Diagnosis—Status and Applications. Institute of Automatic Control, Darmstadt University of Technology, Darmstadt, Germany, Jun. 2004, pp. 1-12.[online], [retrieved on Oct. 8, 2015]. Retrieved from the Internet <URL: http://citeseerx.ist.psu.edu/viewdoc/download?doi=10.1.1.113.9295&rep=rep1 &type=pdf>.

Narasimhan et al. Combining Model-Based and Feature-Driven Diagnosis Approaches—A Case Study on Electromechanical Actuators. 21st International Workshop on Principles of Diagnosis 2010, pp. 1-8. [online], [retrieved on Oct. 8, 2015] Retrieved from the Internet <URL:https://ti.arc.nasa.gov/publications/2266/download/>.

Prentzas et al. Categorizing Approaches Combining Rule-Based and Case-Based Reasoning. Expert Systems 24, Apr. 17, 2007, pp. 1-34 [online], [retrieved on Oct. 8, 2015]. Retrieved from the Internet <URL:http://citeseerx.ist.psu.edu/viewdoc/download?doi=10.1.1.143.2780&rep=rep1&type=pdf>.

Infor M3 Enterprise Management System. Datasheet [online]. Infor, 2014 [retrieved May 19, 2015]. Retrieved from the nternet: <URL:www.infor.com.html>.

Infor Equipment. Datasheet [online]. Infor, 2012 [retrieved May 19, 2015]. Retrieved from the Internet<URL:www.infor.com.html>.

Infor Introduces Next-Generation Solution for Equipment Dealers and Service Providers. Infor, Feb. 2014 pp. 1-5. [online], [retrieved May 19, 2015]. Retrieved from the Internet<URL:www.infor.com/company/news/pressroom/pressreleases/M3equipment.html>.

Infor Equipment for Rental. Datasheet [online] Infor, 2013 [retrieved May 19, 2015]. Retrieved from the Internet<URL: www.infor.com.html>.

Waltermire et al. Applying the Continuous Monitoring Technical Reference Model to the Asset, Configuration, and Vulnerability Management Domains (DRAFT). National Institute of Standards and Technology, U.S. Department of Commerce, Jan. 2012, pp. 1-23 [online], [retrieved Oct. 6, 2015]. Retrieved from the Internet: URL<https://csrc.nist.gov/CSRC/media/Publications/nistir/7800/draft/documents/Draft-NISTIR-7800.pdf.

Architecting a Robust Manufacturing Network for the Internet of Things. GE's Intelligent Platforms business & Cisco Systems Inc. Aug. 2015, pp. 1-17 [online], [retrieved on Aug. 21, 2017]. Retrieved from the internet <URL: www.csco.com/c/dam/en_us/solutions/industries/docs/manufacturing/architecting-robust.pdf>.

Chatzigiannakis et al. Diagnosing Anomalies and Identifying Faulty Nodes in Sensor Networks. Abstract, IEEE Sensors Journal vol. 7 Issue 5, Apr. 16, 2007, pp. 1-4 [online], [retrieved on Aug. 28, 2017]. Retrieved from the internet <URL: http://ieexplore.ieee.org/abstract/document/4154663/?part=1>.

* cited by examiner

COMPUTER SYSTEM AND METHOD OF DETECTING MANUFACTURING NETWORK ANOMALIES

CROSS REFERENCE TO RELATED APPLICATIONS

This application is a continuation of, and claims priority to, U.S. Non-Provisional patent application Ser. No. 15/910,920, now U.S. Pat. No. 10,169,135, which was filed on Mar. 2, 2018 and is entitled "Computer Systems and Method of Detecting Manufacturing Network Anomalies," which is incorporated herein by reference its entirety.

BACKGROUND

Manufacturing facilities typically include numerous pieces of manufacturing or production equipment, also called manufacturing assets. Each manufacturing asset may include one or more electrical, mechanical, electromechanical, and/or electronic components configured to perform one or more operations directly or indirectly associated with a manufacturing task. Examples of manufacturing assets include industrial robots, conveyor assemblies, stamping/forming machinery, and injection molding presses.

In many facilities, manufacturing assets are connected to a manufacturing network that facilitates communication with and control of the manufacturing assets. Communicatively interconnecting manufacturing assets in one or more manufacturing facilities results is many recognized benefits. As one example, connecting manufacturing assets to a manufacturing network may enable such assets to be controlled remotely via the network and may also enable individuals responsible for overseeing the manufacturing assets to receive data regarding the operating of the manufacturing assets via the manufacturing network. For instance, if a given manufacturing asset detects an operational issue (e.g., a temperature of a component exceeding a threshold), the manufacturing asset may send an alert via the manufacturing network to a technician's client station, which may enable the technician to address the operational issue more quickly. As another example, connecting manufacturing assets to a manufacturing network may facilitate communication between manufacturing assets. For instance, a first manufacturing asset could send an alert that a first production task has been completed, and that alert may trigger a second manufacturing asset to begin a second production task, thereby increasing the efficiency and cohesiveness of the overall production run. A manufacturing network may provide various other benefits as well.

In practice, manufacturing networks have certain characteristics that distinguish them from other types of data networks. As one example, manufacturing networks typically have a tree-like topology composed of nodes that are communicatively interlinked, where the nodes in the upper levels of the topology are typically networking devices (e.g., network switches, routers, repeaters, hubs, etc.) and nodes at the edge of the topology are typically programmable logic controllers ("PLCs"), computer numerical controllers ("CNCs"), drive systems, Human Machine Interfaces ("HMIs") or the like that are configured to control manufacturing assets or to allow humans to interact with the manufacturing assets. As another example, the topology of a manufacturing network typically remains fairly static once the network is established, whereas other types of data networks typically have topologies that change frequently (e.g., as wireless devices join and leave the network). Furthermore, given the harsh environment of a manufacturing plant, it is expected that much of the networking uses wired cables and the like due to poor wireless connectivity.

Overview

While the benefits of manufacturing networks are well known and numerous, typical manufacturing networks also have several drawbacks. For example, due to the complexity of the manufacturing network, determining the root cause of network problems may take network administrators a significant amount of time, which may result in costly downtime for the manufacturing network and the manufacturing assets communicatively linked by the manufacturing network. Additionally, a problem with a node in the manufacturing network is difficult to predict, and a given node may fail with little to no warning. Additionally yet, due to the tree-like topology of the manufacturing network, a problem with an upstream node may cause problems with a large number of downstream nodes. Again, such problems may lead to costly downtime of the manufacturing network and the corresponding manufacturing assets.

To address these issues, disclosed herein are techniques for monitoring the operation of a manufacturing network, identifying anomalies in the manufacturing network, and then providing actionable recommendations based on this identification. In accordance with the present disclosure, a data analytics platform may be configured to evaluate a manufacturing network for anomalies at various different levels of granularity. For instance, the data analytics platform may be configured to monitor the manufacturing network as whole for anomalies, which may be referred to as macro-network anomalies. Additionally, the data analytics platform may also be configured to identify discrete segments of the manufacturing network and then evaluate these discrete segments for anomalies, which may be referred to as segment-level anomalies. These discrete segments may take various forms.

As one example, the data analytics platform may be configured to identify and evaluate the operation of a plurality of "micro-networks" in the manufacturing network, where a micro-network is a segment of the manufacturing network 102 that begins with a root node having at least two child nodes. As another example, the data analytics platform may be configured to identify and evaluate the operation of a plurality of "node paths" in the manufacturing network, where a node path is a segment of the manufacturing network that comprises a shortest path between a node and either (1) the root node of the manufacturing network or (2) another node in the manufacturing network. As yet another example, the data analytics platform may be configured to identify and evaluate the operation of a plurality of individual nodes in the manufacturing network, which may comprise all nodes in the manufacturing network or a certain subset of nodes.

In practice, the data analytics platform's evaluation of the manufacturing network at these different levels of granularity may take place at various times. According to one implementation, the data analytics platform may be configured to monitor the manufacturing network at a macro level by default (e.g., on a regular or semi-regular basis), and may then be configured to evaluate one or more different types of discrete segments of the manufacturing network in response to detecting a macro-network anomaly in the manufacturing network. For instance, the data analytics platform may be configured to identify a given time at which at a macro-network anomaly is detected in the manufacturing network and then responsively evaluate the operation of a plurality of discrete segments of the manufacturing network at that given time to determine whether a segment-level is detected in any of the discrete segments of the manufacturing network at the given time. According to another implementation, the data analytics platform may be configured to monitor the manufacturing network at multiple different levels of granularity by default (e.g., on a regular or semi-regular basis). The data analytics platform may evaluate the manufacturing network for anomalies at other times and/or in other manners as well.

Based on the evaluation of the manufacturing network for anomalies, the data analytics platform may identify anomalies in the entire manufacturing network and in one or more segments of the manufacturing network. In turn, the data analytics platform may cause a client station to present an alert that provides information about the identified anomalies. The alert may then enable a user to identify and address the root cause of the anomalies.

Accordingly, in one aspect, disclosed herein is a method that involves (a) monitoring the operation of a plurality of nodes in a manufacturing network that comprises a plurality of edge nodes, a plurality of intermediate nodes, and a root node; (b) while monitoring the operation of the plurality of nodes in the manufacturing network, identifying a given time at which at least one node in the manufacturing network satisfies node-level threshold criteria indicating anomalous operation of the node; (c) in response to identifying the given time at which at least one node satisfies the node-level threshold criteria, evaluating the operation of the manufacturing network at the given time using one or more of (i) macro-level threshold criteria indicating anomalous operation of the manufacturing network as a whole, (ii) micro-level threshold criteria indicating anomalous operation of any micro-network in the manufacturing network, (iii) path-level threshold criteria indicating anomalous operation of any node path in the manufacturing network, and (iv) node-level threshold criteria indicating anomalous operation of any individual node in the manufacturing network; (d) based on the evaluation, identifying one or more anomalies in the manufacturing network at the given time; and (e) causing a client station to present an alert indicating the one or more anomalies identified in the manufacturing network at the given time.

In another aspect, disclosed herein is a method that involves (a) monitoring the operation of a manufacturing network that comprises a plurality of edge nodes, a plurality of intermediate nodes, and a root node; (b) while monitoring the operation of the manufacturing network, identifying a given time at which the manufacturing network satisfies macro-level threshold criteria indicating anomalous operation of the manufacturing network; (c) in response to identifying the given time at which the manufacturing network satisfies the macro-network threshold criteria, evaluating the operation of a plurality of discrete segments of the manufacturing network at the given time to determine whether any of the plurality of discrete segments of the manufacturing network satisfies segment-level threshold criteria indicating anomalous operation of the segment; (d) based on the evaluation, identifying one or more segments of the manufacturing network that were anomalous at the given time; and (e) causing a client station to present an alert indicating that the identified one or more segments of the manufacturing network were anomalous at the given time.

In yet another aspect, disclosed herein is a computing system comprising a network interface, at least one processor, a non-transitory computer-readable medium, and program instructions stored on the non-transitory computer-readable medium that are executable by the at least one processor to cause the computing system to carry out the functions disclosed herein.

In still another aspect, disclosed herein is a non-transitory computer-readable medium having instructions stored thereon that are executable to cause a computing system to carry out the functions disclosed herein.

One of ordinary skill in the art will appreciate these as well as numerous other aspects in reading the following disclosure.

DETAILED DESCRIPTION

The following disclosure makes reference to the accompanying figures and several exemplary scenarios. One of ordinary skill in the art will understand that such references are for the purpose of explanation only and are therefore not meant to be limiting. Part or all of the disclosed systems, devices, and methods may be rearranged, combined, added to, and/or removed in a variety of manners, each of which is contemplated herein.

I. EXAMPLE NETWORK CONFIGURATION

Figure 1:
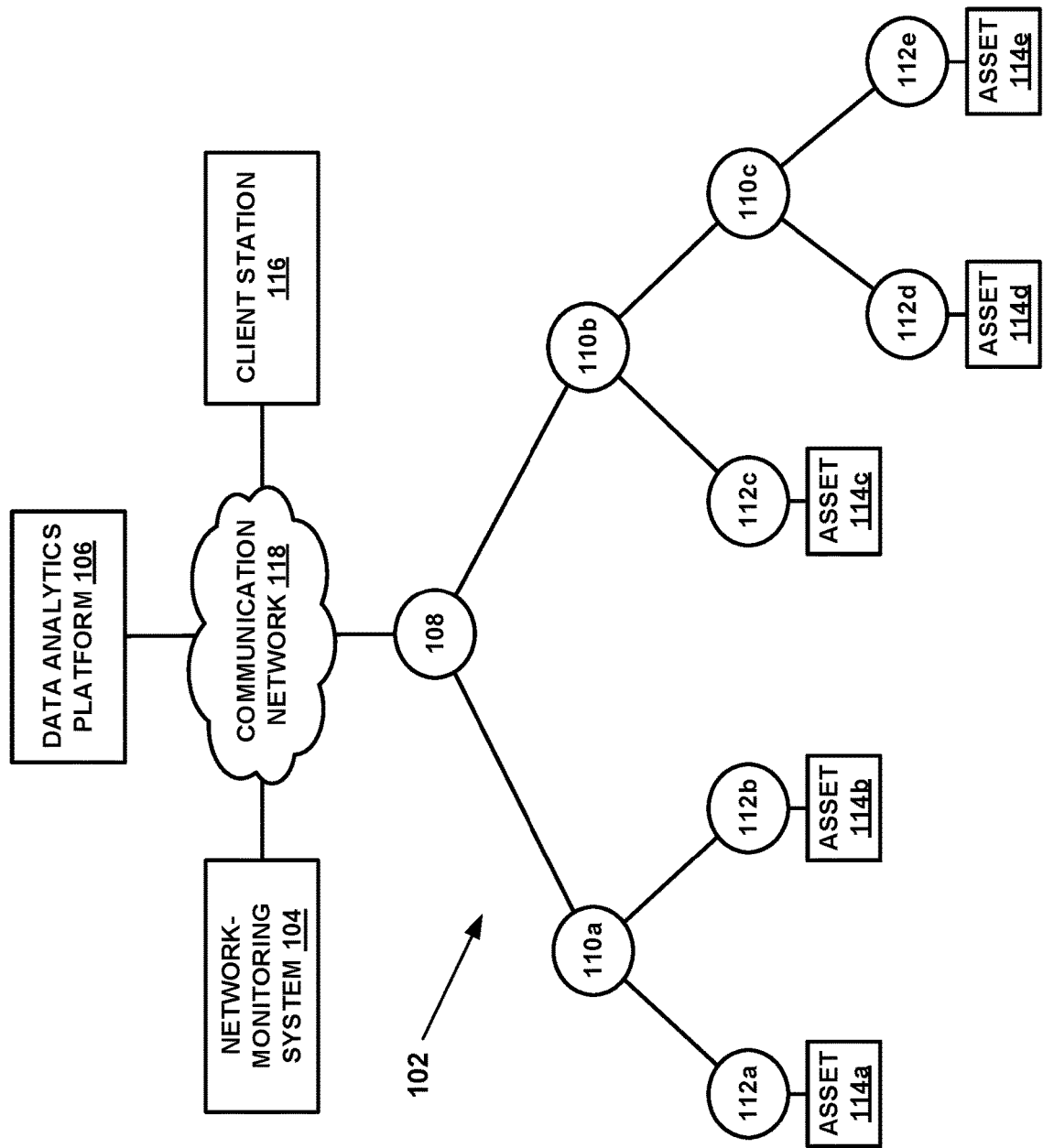
FIG. 1 depicts an example manufacturing network configuration in which example embodiments may be implemented.

Turning now to the figures, FIG. 1 depicts an example system 100 in which example embodiments may be implemented. As shown, the system 100 includes a manufacturing network 102, a network-monitoring system 104, and a data analytics platform 106, which may be communicatively coupled via a communication network 118. It should be understood that the system 100 may include various other entitles as well.

In general, the manufacturing network 102 may be a network of nodes that facilitates communication with and/or control of manufacturing assets in a manufacturing facility or the like. As shown in FIG. 1, the nodes in the manufacturing network 102 may be arranged in a tree-like topology, where the nodes at the edge of the topology (i.e., the "edge nodes") are generally configured to control the manufacturing assets and the other upstream nodes in the topology are generally configured to facilitate communication between and among the edge nodes and other computer systems and devices that are external to the manufacturing network 102.

In FIG. 1, the manufacturing network 102 is shown as including a root node 108, a plurality of intermediate nodes 110, such as intermediate nodes 110a, 110b, and 110c, and a plurality of edge nodes 112 that are coupled to respective manufacturing assets 114, such as edge node 112a coupled to manufacturing asset 114a, edge node 112b coupled to manufacturing asset 114b, edge node 112c coupled to manufacturing asset 114c, edge node 112d coupled to manufacturing asset 114d, and edge node 112e coupled to manufacturing asset 114e. However, there may be several variations to this manufacturing network configuration.

For example, while the manufacturing network 102 is shown as including a plurality of intermediate nodes 110, it is possible that a manufacturing network 102 may not include any intermediate nodes 110 (i.e., the root node 108 may be coupled directly to the edge nodes 112), or may possibly include only a single intermediate node 110 in some circumstances. As another example, while the root node 108 and the intermediate nodes 110 are each shown as being coupled to two downstream nodes (i.e., two intermediate nodes 110 and/or edge nodes 112), it should be understood that the root node 108 and each intermediate node 110 may be coupled to any number of downstream nodes. As yet another example, while the edge nodes 112 are described as being coupled to respective manufacturing assets 114, it should be understood that a manufacturing asset 114 may itself operate as an edge node 112, in which case an edge node 112 and its respective manufacturing asset 114 may effectively be integrated together into a single device. Other variations are possible as well.

In general, the root node 108 may be a networking device (e.g., a router, gateway, switch, hub, etc.) that sits at the top of the manufacturing network 102 and serves as the communication interface between the manufacturing network 102 and other computing systems devices, such as the networking-monitoring system 104, data analytics platform 106, and/or client station 116. In this respect, the root node 108 generally has no "parent" node and one or more "child" nodes in the manufacturing network 102. The root node 108 is discussed in further detail below with reference to FIG. 2.

In general, each intermediate node 110 may be a networking device (e.g., a router, gateway, switch, hub, etc.) that sits between the root node 108 and at least one edge node 112 and serves as a communication interface between the root node 108 and the at least one edge node 112. As shown, a given intermediate node 110 may either be coupled directly to the root node 108 (e.g., in the case of intermediate nodes 110a and 110b), or may be indirectly coupled to the root node 108 via one or more other intermediate nodes 110 that sits above the given intermediate node 110 (e.g., in the case of intermediate node 110c). Likewise, as shown, a given intermediate node 110 may either be coupled directly to an edge node 112, or may be indirectly coupled to an edge node 112 via one or more other intermediate nodes 110 (e.g., in the case of intermediate node 110b vis-à-vis edge nodes 112d and 112e). In this respect, each intermediate node 110 in the manufacturing network 102 generally has both a "parent" node (which may be the root node 108 or another intermediate node 110) and also one or more "child" nodes (which may comprise one or more other intermediate nodes 110 and/or one or more edge nodes 112). The intermediate nodes 110 are discussed in further detail below with reference to FIG. 2.

In general, each edge node 112 may be a device that sits at the bottom (or "edge") of the manufacturing network 102 that may be coupled with a corresponding manufacturing asset 114 (e.g., by performing sequential relay control, motion control, process control, etc.). In this respect, each edge node 112 in the manufacturing network 102 generally has a "parent" node (which may be the root node 108 or another intermediate node 110) but no "child" node. Such an edge node 112 may take various forms, an example of which comprises a programmable logic controller (PLC). The edge node 112 may also be a device not associated with a manufacturing asset 114, such as a personal computer, a server, a camera and such. The edge nodes 112 are discussed in further detail below with reference to FIG. 3.

In general, each manufacturing asset 114 may take the form of any device configured to perform one or more operations that are directly or indirectly associated with a manufacturing task. In this respect, the manufacturing assets 114 may each include one or more mechanical, electrical, electromechanical, and/or electronic components configured to perform such operations. For instance, the manufacturing assets may take the form of robotics devices and/or other types of assembly-line machines (e.g., stamping/forming machines, injection molding presses, computer numerical control ("CNC") machines, printers, cutters, etc.). Manufacturing assets 114 may also encompass manufacturing infrastructure equipment such as conveyor systems, elevators, and automated guided vehicles. However, it should be understood that these are but a few examples of manufacturing assets and that numerous others are possible and contemplated herein. Such manufacturing assets may be located in the same physical location (e.g., a single manufacturing facility) or may be located in different physical locations (e.g., multiple manufacturing facilities).

While the edge nodes 112 are shown as being separate entities from their corresponding manufacturing assets 114, it should also be understood that an edge node 112 and a corresponding manufacturing asset 114 may be integrated together into a single physical entity (e.g., a given asset may have an embedded PLC). The edge nodes 112 and corresponding manufacturing assets 114 may be implemented in other manners as well.

As further shown in FIG. 1, each node in the manufacturing network 102 may be communicatively coupled to its parent node and/or one or more child nodes via a respective communication link. Such communication links may take various forms. As one possibility, the communication links between the nodes may take the form of wired links, such as Ethernet cables or the like. As another possibility, the communication links between the nodes may take the form of wireless links that are defined according to a wireless protocol, examples of which may include WiFi, Bluetooth, IrDA, ZigBee, among others. The communication links between the nodes may take other forms as well. It should also be understood that the communication links between the nodes may take different forms (e.g., some nodes may be coupled via wired links while other nodes may be coupled via wireless links).

Referring again to FIG. 1, the network-monitoring system 104 may generally take the form of one or more computer systems that are configured to monitor the operation of the manufacturing network 102 and capture data related to the operation of the manufacturing network 102, which may be referred to herein as network operating data. As examples, the network-monitoring system 104 could be a dedicated network-monitoring appliance or a general-purpose computer system (e.g., a server, personal computer, or the like) that is installed with software for monitoring a manufacturing network. The network-monitoring system 104 may reside physically within the manufacturing facility or it may reside at an external location. The network-monitoring system 104 could take other forms as well.

In practice, the network-monitoring system 104 may monitor various metrics related to the operation of the nodes in the manufacturing network 102. For instance, for each respective node in the manufacturing network 102 (or at least a subset of the nodes in the manufacturing network 102), the network-monitoring system 104 may capture data values for select operating metrics, such as a measure of transmission delays to and from the node in terms of delays in transmitting and receiving data and/or control packets, the extent of transmission loss for the node in terms of loss of data and/or control packets, the amount of bandwidth consumed by the node, the throughput and the computer-resource utilization of the node, the extent of power failures and/or power interruptions at the node, etc. Further, in practice, the network-monitoring system 104 may capture the values for these operating metrics at various times (e.g., every few minutes according to a schedule). The network-monitoring system 104 may capture various other network operating data for the manufacturing network 102 as well.

While the network-monitoring system 104 is shown as being a separate entity from the nodes of the manufacturing network 102, it should be understood that one or more nodes of the manufacturing network (e.g., root node 108) may be configured to serve as the network-monitoring system 104 for the manufacturing network 102. The network-monitoring system 104 may be implemented in other manners as well.

In accordance with the present disclosure, the network-monitoring system 104 may also be configured to transmit network operating data for the manufacturing network 102 to the data analytics platform 106 for further analysis.

Broadly speaking, the data analytics platform 106 may take the form of one or more computer systems that are configured to receive, ingest, process, analyze, and/or provide access to data related to a manufacturing network, such as manufacturing network 102. For instance, the data analytics platform 106 may include one or more servers (or the like) having hardware components and software components that are configured to carry out one or more of the functions disclosed herein for receiving, ingesting, processing, analyzing, and/or providing access to network operating data. In practice, the data analytics platform 106 may be located in a single physical location or distributed amongst a plurality of locations, and may be communicatively linked via a system bus, a communication network, or some other connection mechanism.

In one particular implementation, the data analytics platform 106 may comprise the computing infrastructure of an Internet Area Network (IAN) such as a public, private, or hybrid cloud. In another implementation, the data analytics platform 106 may comprise one or more dedicated servers, which may be located either at a different location from the manufacturing network 102 or at the same general location as the manufacturing network 102 (e.g., at a manufacturing facility). The data analytics platform 106 may take various other forms as well, and is discussed in further detail below with reference to FIGS. 4-5.

Referring again to FIG. 1, the communication network 118 may generally include one or more computing systems, network infrastructure, and/or communication links that are configured to facilitate transferring data between the manufacturing network 102, the network-monitoring system 104, and/or the data analytics platform 106. The communication network 104 may comprise one or more Local-Area Networks (LANs) and/or Wide-Area Networks (WANs), which may be wired and/or wireless and may support secure communication. In some examples, the communication network 118 may include one or more cellular networks and/or the Internet, among other networks. The communication network 118 may operate according to one or more communication protocols, such as LTE, CDMA, GSM, LPWAN, WiFi, Bluetooth, Ethernet, HTTP/S, TCP, CoAP/DTLS and the like.

Although the communication network 118 is shown as a single network, it should also be understood that the communication network 118 may include multiple, distinct networks that are themselves communicatively linked. For example, the communication network 118 may include a first communication network (e.g., a LAN) that communicatively couples the manufacturing network 102 to the network-monitoring system 104 and then a second communication network (e.g., the Internet) that communicatively couples the manufacturing network 102 and/or the network-monitoring system 104 to the data analytics platform 106. Further, in some embodiments, the manufacturing network 102, the network-monitoring system 104, and/or the data analytics platform 106 may be coupled with one another via a single communication link, such as an Ethernet cable or a wireless point-to-point link for instance. The communication network 118 could take other forms as well.

Further, although not shown, the communication path between the manufacturing network 102, the network-monitoring system 104, and/or the data analytics platform 106 may include one or more intermediate devices. Many other configurations are also possible.

As further shown in FIG. 1, the system 100 may also include a client station 116 that is communicatively coupled to the manufacturing network 102, the network-monitoring system 104, and/or the data analytics platform 106 via the communication network 118. The client station 116 may take the form of any computing system and/or device that enables a user to interact with the manufacturing network 102, the network-monitoring system 104, and/or the data analytics platform 106. To facilitate this, the client station 116 may include hardware components such as a user interface, a network interface, a processor, and data storage, among other components. Additionally, the client station 116 may be configured with software components that enable interaction with the manufacturing network 102, the network-monitoring system 104, and/or the data analytics platform 106 via a graphical user interface or the like, such as a web browser that is capable of accessing a web application provided by the manufacturing network 102, the network-monitoring system 104, and/or the data analytics platform 106 or a native client application associated with the manufacturing network 102, the network-monitoring system 104, and/or the data analytics platform 106, among other examples. Representative examples of client stations may include a desktop computer, a laptop, a netbook, a tablet, a smartphone, a personal digital assistant (PDA), or any other such device now known or later developed.

II. EXAMPLE NETWORKING DEVICE

Figure 2:
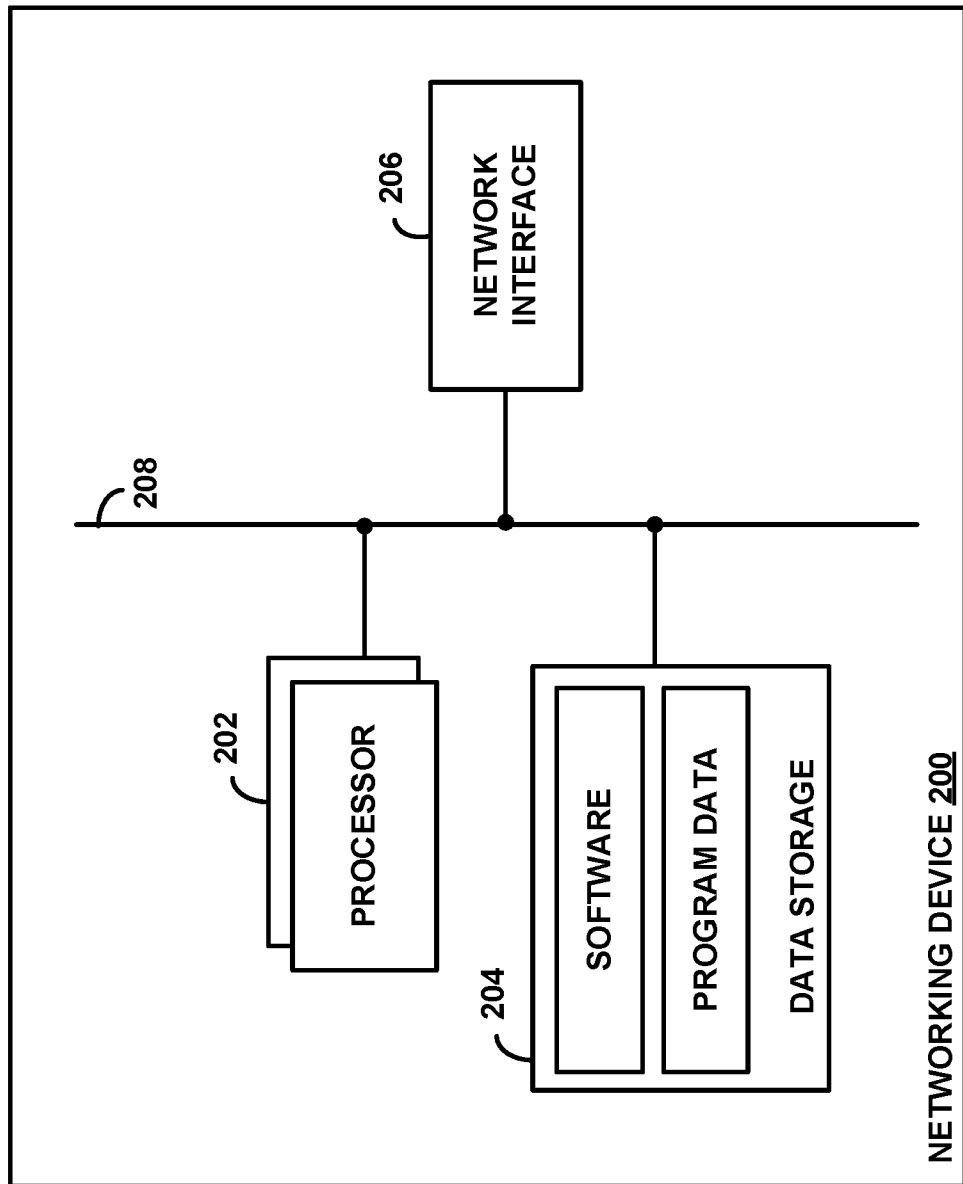
FIG. 2 depicts a simplified block diagram of an example root node or intermediate node.

FIG. 2 is a simplified block diagram illustrating some components that may be included in an example networking device 200 (e.g., a router, gateway, switch, hub, etc.) that is capable of serving as a root node or intermediate node of a manufacturing network, such as root node 108 or one of the intermediate nodes 110 of the manufacturing network 102. As shown, the example networking device 200 may include one or more processors 202, data storage 204, and a network interface 206, all of which may be communicatively linked by a communication link 208 that may take the form of a system bus, communication network, or some other connection mechanism. One of ordinary skill in the art will appreciate that the networking device 200 may also include additional components that are not shown and/or more or less of the depicted components.

The processor 202 may include one or more processors and/or controllers, which may take the form of a general- or special-purpose processor or controller. In particular, in example implementations, the processor 202 may be or include microprocessors, microcontrollers, application specific integrated circuits, digital signal processors, and the like. In turn, the data storage 204 may be or include one or more non-transitory computer-readable storage media, such as optical, magnetic, organic, or flash memory, among other examples. As shown, the data storage 204 may contain software and/or program data, among other examples.

The network interface 206 may be configured to facilitate wireless and/or wired communication between the networking device 200 and various other networked-enabled devices and systems, such as other nodes in a manufacturing network and/or the data analytics platform 106. As such, network interface 206 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wired and/or wireless communication. Other examples are possible as well. In practice, the network interface 206 may be configured according to a communication protocol, such as but not limited to any of those described above. Network interface 206 may also include multiple network interfaces that support various different types of network connections.

One of ordinary skill in the art will appreciate that the networking device 200 shown in FIG. 2 is but one example of a simplified representation of a networking device, and that numerous other examples are also possible.

III. EXAMPLE EDGE NODE

Figure 3:
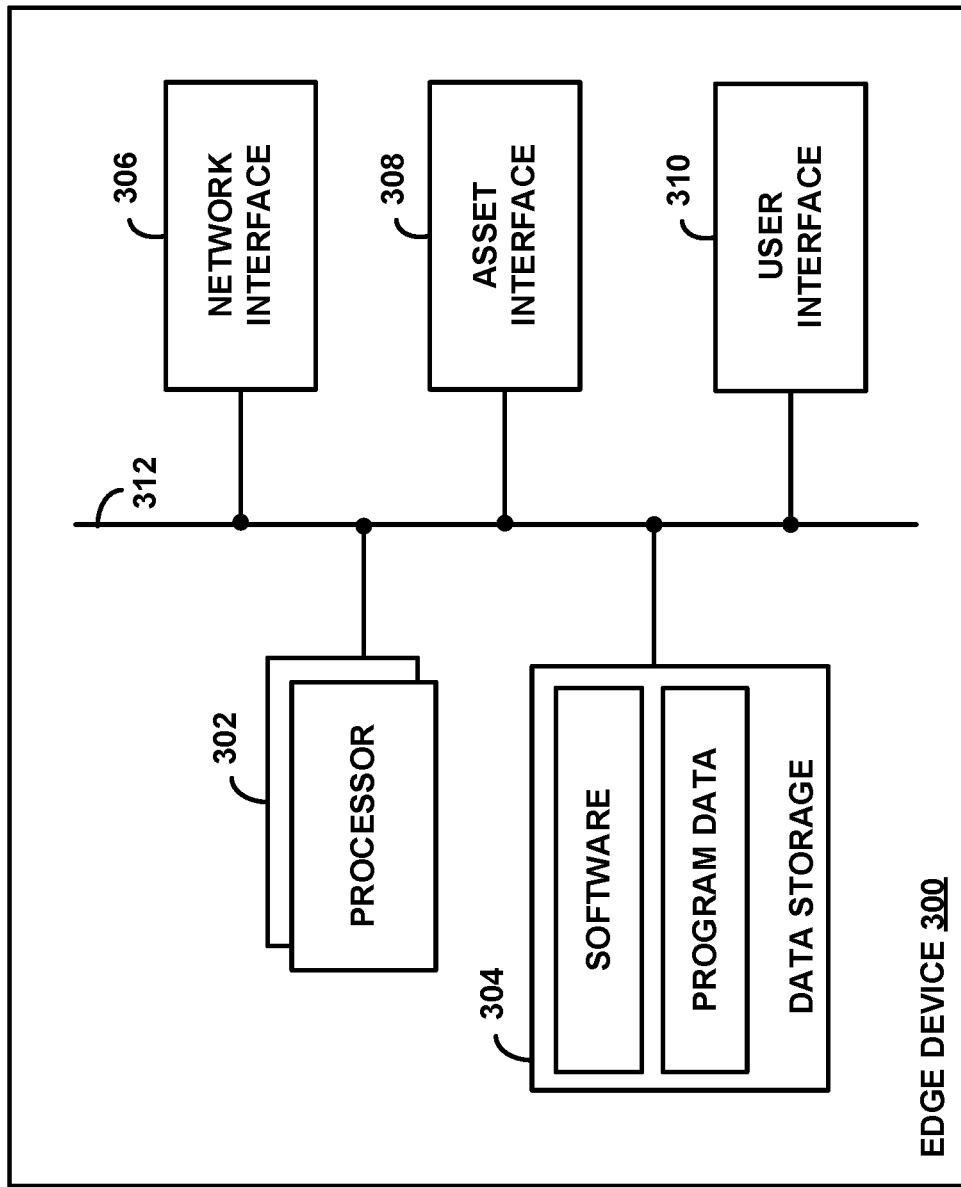
FIG. 3 depicts a simplified block diagram of an example edge node.

FIG. 3 is a simplified block diagram illustrating some components that may be included in an example device 300 that is capable of serving as an edge node of a manufacturing network, such as one of the edge nodes 112 of the manufacturing network 102. As shown, the example device 300 may include one or more processors 302, data storage 304, network interface 306, asset interface 308, and also potentially a user interface 310, all of which may be communicatively linked by a communication link 312 that may take the form of a system bus, communication network, or some other connection mechanism. One of ordinary skill in the art will appreciate that the networking device 200 may also include additional components that are not shown and/or more or less of the depicted components.

The processor 302 may include one or more processors and/or controllers, which may take the form of a general- or special-purpose processor or controller. In particular, in example implementations, the processor 302 may be or include microprocessors, microcontrollers, application specific integrated circuits, digital signal processors, and the like. In turn, the data storage 304 may be or include one or more non-transitory computer-readable storage media, such as optical, magnetic, organic, or flash memory, among other examples. As shown, the data storage 304 may contain software and/or program data, among other examples.

The network interface 306 may be configured to facilitate wireless and/or wired communication between the device 300 and various other networked-enabled devices and systems, such as other nodes in a manufacturing network and/or the data analytics platform 106. As such, the network interface 306 may take any suitable form for carrying out this function, examples of which may include an Ethernet interface, a serial bus interface (e.g., Firewire, USB 2.0, etc.), a chipset and antenna adapted to facilitate wireless communication, and/or any other interface that provides for wired and/or wireless communication. Other examples are possible as well. In practice, the network interface 306 may be configured according to a given communication protocol, such as one of the protocols discussed above and/or a manufacturer-specific protocol. Network interface 306 may also include multiple network interfaces that support various different types of network connections.

The asset interface 308 may be configured to facilitate wireless and/or wired communication between the device 300 and an asset, such as one of the manufacturing assets 114 in manufacturing network 102, thereby enabling the device 300 to communication with and control a manufacturing asset. The asset interface 308 may take any suitable form for carrying out this function, examples of which may include an Ethernet interface, a serial bus interface (e.g., Firewire, USB 2.0, RS-232, RS-485, RS-422, etc.), a chipset and antenna adapted to facilitate wireless communication with an asset, and/or any other interface that provides for wired and/or wireless communication with an asset. Other examples are possible as well. In practice, the asset interface 308 may be configured according to a given communication protocol, such as one of the protocols discussed above and/or a manufacturer-specific protocol. Asset interface 308 may also include multiple asset interfaces that support various different types of asset connections. It should be understood that if the device 300 is a device not associated with a manufacturing asset 114 (such as a personal computer, a server, a camera and such), the device 300 may not include an asset interface 308.

As discussed above, the device 300 may also optionally include a user interface 310, which may be configured to facilitate interaction with a user. Such a user interface 310 may take any suitable form for carrying out this function, examples of which may include a touch-sensitive interface, mechanical interfaces (e.g., levers, buttons, wheels, dials, keyboards, etc.), a display screen, speakers, a headphone jack, and the like. In other implementations, a user may interact with the device 300 via a client station that is communicatively coupled to the device 300 via the network interface 306. Other implementations are possible as well.

One of ordinary skill in the art will appreciate that the edge device 300 shown in FIG. 3 is but one example of a simplified representation of a networking device, and that numerous other examples are also possible.

IV. EXAMPLE PLATFORM

Figure 4:
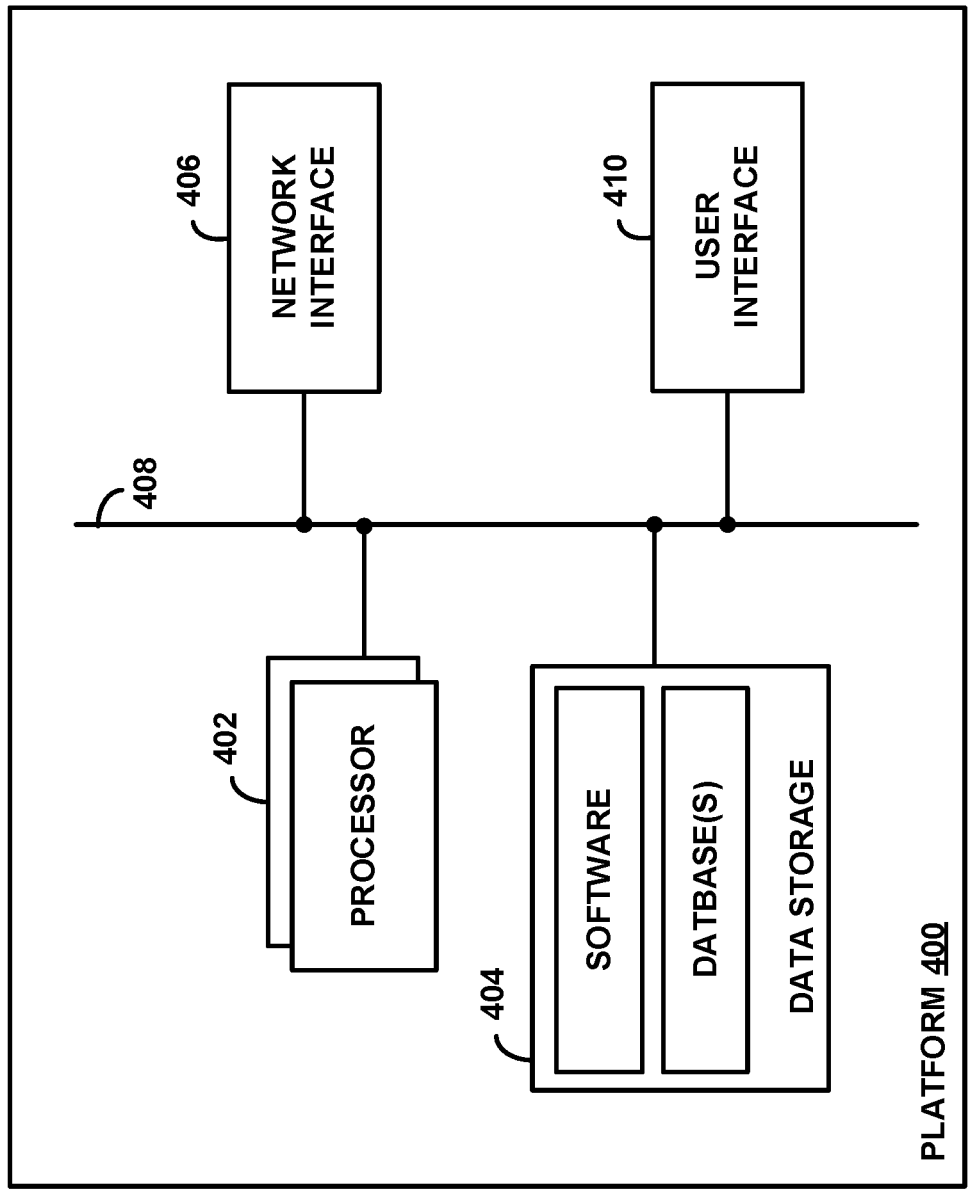
FIG. 4 depicts a structural diagram of an example platform.

FIG. 4 is a simplified block diagram illustrating some components that may be included in an example data analytics platform 106 from a structural perspective. In line with the discussion above, the data analytics platform 106 may generally comprise one or more computer systems (e.g., one or more servers), and these one or more computer systems may collectively include one or more processors 402, data storage 404, network interface 406, and perhaps also a user interface 410, all of which may be communicatively linked by a communication link 408 such as a system bus, network, or other connection mechanism.

The processor 402 may comprise one or more processors and/or controllers, which may take the form of a general- or special-purpose processors or controllers. In particular, in example implementations, the processor 402 may include microprocessors, microcontrollers, application-specific integrated circuits, digital signal processors, or the like. There may be multiple processors that are distributed over multiple locations.

In turn, data storage 404 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, an optical-storage device, etc.

As shown, the data storage 404 may be provisioned with software components that enable the data analytics platform 106 to carry out the functions disclosed herein. These software components may generally take the form of program instructions that are executable by the processor 402, and may be arranged together into applications, software development kits, toolsets, or the like. In addition, the data storage 404 may also be provisioned with one or more databases that are arranged to store data related to the functions carried out by the platform, examples of which include time-series databases, document databases, relational databases (e.g., MySQL), key-value databases, and graph databases, among others. The one or more databases may also provide for polyglot storage. In addition, the data storage may be distributed over multiple physical locations.

The network interface 406 may be configured to facilitate wireless and/or wired communication between the data analytics platform 106 and various network components via the communication network 112, such as root nodes 106, intermediate nodes 110, and edge nodes 112. As such, network interface 406 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wired and/or wireless communication. Network interface 406 may also include multiple network interfaces that support various different types of network connections, some examples of which may include Hadoop, FTP, relational databases, high frequency data such as OSI PI, batch data such as WL, and Base64. Other configurations are possible as well.

The example data analytics platform 106 may also support a user interface 410 that is configured to facilitate user interaction with the data analytics platform 106 and may also be configured to facilitate causing the data analytics platform 106 to perform an operation in response to user interaction. This user interface 410 may include or provide connectivity to various input components, examples of which include touch-sensitive interfaces, mechanical interfaces (e.g., levers, buttons, wheels, dials, keyboards, etc.), and other input interfaces (e.g., microphones). Additionally, the user interface 410 may include or provide connectivity to various output components, examples of which may include display screens, speakers, headphone jacks, and the like. Other configurations are possible as well, including the possibility that the user interface 410 is embodied within a client station that is communicatively coupled to the example platform.

Figure 5:
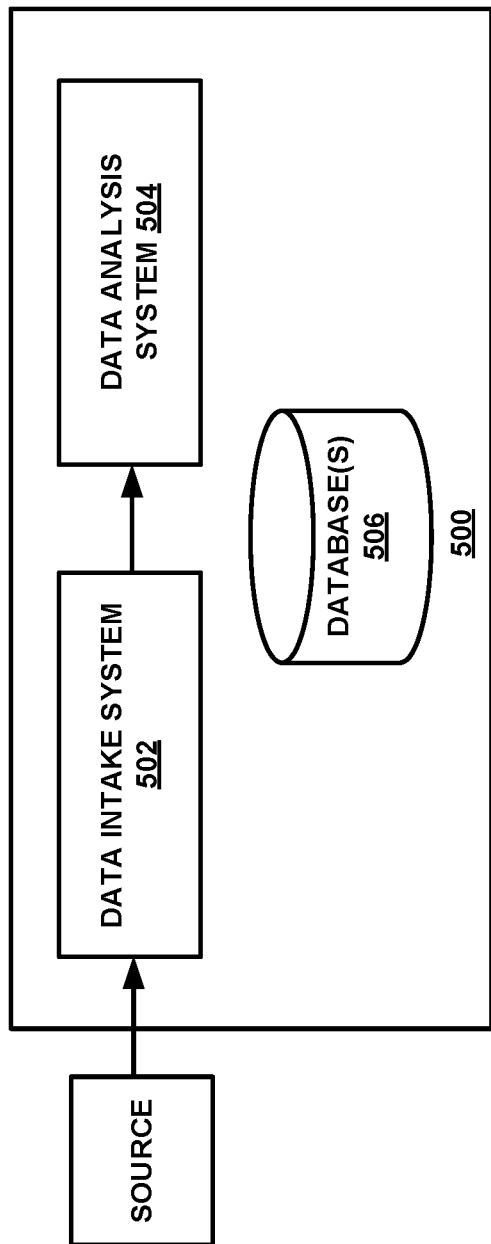
FIG. 5 is a functional block diagram of an example platform.

Referring now to FIG. 5, another simplified block diagram is provided to illustrate some components that may be included in an example data analytics platform 106 from a functional perspective. For instance, as shown, the example data analytics platform 106 may include a data intake system 502 and a data analysis system 504, each of which comprises a combination of hardware and software that is configured to carry out particular functions. The data analytics platform 106 may also include a plurality of databases 506 that are included within and/or otherwise coupled to one or more of the data intake system 502 and the data analysis system 504. In practice, these functional systems may be implemented on a single computer system or distributed across a plurality of computer systems.

The data intake system 502 may generally function to receive data related to a manufacturing network, such as network operating data, and then provide at least a portion of the received data to the data analysis system 504. In this respect, the data intake system 502 may be configured to receive data related to a manufacturing network from various sources, examples of which may include the manufacturing network itself, a network-monitoring system, or some other intermediate device. In practice, the data received by the data intake system 502 may take the form of data packets that are transmitted over a communication network, but the data could take other forms as well. Further, in some examples, the data intake system 502 may be configured according to a given dataflow technology, such as a NiFi receiver or the like.

The data intake system 502 may also be configured to perform various pre-processing functions on the data that it receives, in an effort to provide data to the data analysis system 504 that is clean, up to date, accurate, usable, etc.

For example, the data intake system 502 may map the received data into defined data structures and potentially drop any data that cannot be mapped to these data structures. As another example, the data intake system 502 may assess the reliability (or "health") of the received data and take certain actions based on this reliability, such as dropping any unreliable data. As yet another example, the data intake system 502 may "de-duplicate" the received data by identifying any data has already been received by the platform and then ignoring or dropping such data. As still another example, the data intake system 502 may determine that the received data is related to data already stored in the platform's databases 506 (e.g., a different version of the same data) and then merge the received data and stored data together into one data structure or record. As a further example, the data intake system 502 may identify actions to be taken based on the received data (e.g., CRUD actions) and then notify the data analysis system 504 of the identified actions (e.g., via HTTP headers). As still a further example, the data intake system 502 may split the received data into particular data categories (e.g., by placing the different data categories into different queues). Other functions may also be performed.

The data intake system 502 may further be configured to store the received data in one or more of the databases 506 for later retrieval. For example, the data intake system 502 may store the raw data received from a given source (e.g., the network-monitoring system 104) and may also store the data resulting from one or more of the pre-processing functions described above. In line with the discussion above, the databases to which the data intake system 502 stores this data may take various forms, examples of include a time-series database, document database, a relational database (e.g., MySQL), a key-value database, and a graph database, among others. Further, the databases may provide for polyglot storage. For example, the data intake system 502 may store the payload of received data in a first type of database (e.g., a time-series or document database) and may store the associated metadata of received data in a second type of database that permit more rapid searching (e.g., a relational database). In such an example, the metadata may then be linked or associated to the data stored in the other database which relates to the metadata. The databases 506 used by the data intake system 502 may take various other forms as well.

As shown, the data intake system 502 may then be communicatively coupled to the data analysis system 504. This interface between the data intake system 502 and the data analysis system 504 may take various forms. For instance, the data intake system 502 may be communicatively coupled to the data analysis system 504 via an API. Other interface technologies are possible as well.

The data analysis system 504 may generally function to receive data from the data intake system 502, analyze that data, and then take various actions based on that data. These actions may take various forms.

As one example, the data analysis system 504 may identify certain data that is to be output to a client station (e.g., based on a request received from the client station) and may then provide this data to the client station. As another example, the data analysis system 504 may determine that certain data satisfies a predefined rule and may then take certain actions in response to this determination, such as generating new event data or providing a notification to a user via the client station. As another example, the data analysis system 504 may use the received data to train and/or execute a predictive model related to asset operation, and the data analysis system 504 may then take certain actions based on the predictive model's output. As still another example, the data analysis system 504 may make certain data available for external access via an API.

In order to facilitate one or more of these functions, the data analysis system 504 may be configured to provide (or "drive") a user interface that can be accessed and displayed by a client station. This user interface may take various forms. As one example, the user interface may be provided via a web application, which may generally comprise one or more web pages that can be displayed by the client station in order to present information to a user and also obtain user input. As another example, the user interface may be provided via a native client application that is installed and running on a client station but is "driven" by the data analysis system 504. The user interface provided by the data analysis system 504 may take other forms as well.

In addition to analyzing the received data for taking potential actions based on such data, the data analysis system 504 may also be configured to store the received data into one or more of the databases 506. For example, the data analysis system 504 may store the received data into a given database that serves as the primary database for providing node attribute data to platform users.

In some embodiments, the data analysis system 504 may also support a software development kit (SDK) for building, customizing, and adding additional functionality to the platform. Such an SDK may enable customization of the platform's functionality on top of the platform's hardcoded functionality.

The data analysis system 504 may perform various other functions as well. Some functions performed by the data analysis system 504 are discussed in further detail below.

One of ordinary skill in the art will appreciate that the example platform shown in FIGS. 4-5 is but one example of a simplified representation of the components that may be included in a platform and that numerous others are also possible. For instance, other platforms may include additional components not pictured and/or more or less of the pictured components. Moreover, a given platform may include multiple, individual platforms that are operated in concert to perform operations of the given platform. Other examples are also possible.

V. EXAMPLE OPERATIONS

Example operations of the example network configuration 100 depicted in FIG. 1 will now be discussed in further detail below. To help describe some of these operations, flow diagrams may be referenced to describe combinations of operations that may be performed. In some cases, each block may represent a module or portion of program code that includes instructions that are executable by a processor to implement specific logical functions or steps in a process. The program code may be stored on any type of computer-readable medium, such as non-transitory computer-readable media. In other cases, each block may represent circuitry that is wired to perform specific logical functions or steps in a process. Moreover, the blocks shown in the flow diagrams may be rearranged into different orders, combined into fewer blocks, separated into additional blocks, and/or removed based upon the particular embodiment.

In accordance with the present disclosure, the data analytics platform 106 may be configured to monitor the manufacturing network 102 for anomalous behavior at various different levels of granularity. For instance, the data analytics platform 106 may be configured to monitor the operation of the manufacturing network 102 as a whole for anomalous behavior. Additionally, the data analytics platform 106 may be configured to identify discrete segments of the manufacturing network 102 and then monitor the operation of these discrete segments for anomalous behavior. These discrete segments may take various forms.

As one option, the data analytics platform 106 may be configured to identify and monitor the operation of a plurality of "micro-networks" in the manufacturing network 102, where a micro-network is a segment of the manufacturing network 102 that begins with a "micro" root node (e.g., a root node 108 or an intermediate node 110) having at least two child nodes. For instance, in the manufacturing network 102 depicted in FIG. 1, there are up to three different micro-networks that may be identified: (1) a first micro-network that includes node 110a as the "micro" root node and then nodes 112a and 112b, which are two edge nodes that also are child nodes for 110a; (2) a second micro-network that includes node 110b as the "micro" root node and then child nodes 112c (edge node), 110c (intermediate node), 112d (edge node), and 112e (edge node); and (3) a third micro-network that includes node 110c as the "micro" root node and then child nodes 112d and 112e.

As another option, the data analytics platform 106 may be configured to identify and monitor the operation of a plurality of "node paths" in the manufacturing network 102, where a node path is a segment of the manufacturing network 102 that comprises a shortest path between a node (e.g., an intermediate node 110 or an edge node 112) and either (1) the root node 108 of the manufacturing network 102 or (2) another node (e.g., another intermediate node 110 or another edge node 112) in the manufacturing network 102. In one particular embodiment, the data analytics platform 106 may be configured to identify and monitor the operation of a plurality of "node paths" in the manufacturing network 102, where a node path is a segment of the manufacturing network 102 that comprises a shortest path between an edge node 112 and either (1) the root node 108 of the manufacturing network 102 or (2) another edge node 112 in the manufacturing network 102. For instance, in the manufacturing network 102 depicted in FIG. 1, the node paths include the shortest path from each edge node 112 to the root node 108 (e.g., edge node 112a to root node 108, edge node 112b to root node 108, and so on, for a total of 5 paths) as well as the shortest path between each combination of two edge nodes 112 (e.g., edge node 112a to edge node 112b, edge node 112a to edge node 112c, and so on, for a total of 10 paths).

As yet another option, the data analytics platform 106 may be configured to identify and monitor the operation of a plurality of individual nodes in the manufacturing network 102, which may comprise all nodes in the manufacturing network 102 or a certain subset of nodes.

The data analytics platform 106 may be configured to identify and monitor other types of discrete segments of the manufacturing network 102 as well.

Example approaches for evaluating the manufacturing network 102 for anomalous operation at each of these different levels of granularity (e.g., macro-network, micro-network, node path, and individual node) will now be described in further detail below.

A. Evaluating Operation of a Macro-Network

In accordance with the present disclosure, the data analytics platform 106 may be configured to evaluate the manufacturing network 102 as a whole, which may be referred to as the "macro-network," for anomalous operation that may be referred to as a "macro-network anomaly" (or "macro-level anomaly"). In practice, the data analytics platform 106 may evaluate the manufacturing network 102 for macro-network anomalies at various times, such as periodically according to a schedule, each time the data analytics platform 106 receives new operating data for the manufacturing network 102, in response to a user request, and/or in response to some other triggering event, among other possibilities. Further, in practice, the data analytics platform's evaluation of the manufacturing network 102 for macro-network anomalies may generally be based on operating data for the manufacturing network 102 that is received from a source, such as the network-monitoring system 104. In line with the discussion above, this operating data may include metrics for nodes in the manufacturing network 102 such as the amount of transmission delays to and from a node, the extent of transmission losses to and from a node, the amount of bandwidth consumed by a node, the throughput, the computer-resource utilization of a node, the extent of power failures and/or power interruptions at a node, etc. However, the data analytics platform's evaluation of the manufacturing network 102 for macro-network anomalies may take place at other times and/or be based on other types of data as well.

The data analytics platform's evaluation of the manufacturing network 102 for macro-network anomalies may take various forms. At a high level, this function may involve an evaluation of whether the manufacturing network 102 satisfies macro-network-level threshold criteria indicating a macro-network anomaly in the manufacturing network 102. Such an evaluation may take various forms.

In one embodiment, the data analytics platform's evaluation of whether the manufacturing network 102 satisfies macro-network-level threshold criteria indicating a macro-network anomaly at a given time may involve evaluating the operation of each node in the manufacturing network 102 at the given time (e.g., based on operating data for each node) to determine whether any node in the manufacturing network 102 satisfies node-level threshold criteria indicating anomalous node operation. Based on that evaluation, the data analytics platform's evaluation may also involve determining an extent of nodes in the manufacturing network 102 that were anomalous at the given time. If the extent of nodes in the manufacturing network 102 that were anomalous at the given time exceeds a threshold extent of anomalous nodes in manufacturing network 102, the data analytics platform's evaluation may further involve determining that there was a macro-network anomaly in the manufacturing network 102 at the given time. The given time may be a given time instance or a given time interval.

In such an embodiment, the function of evaluating the operation of a node in the manufacturing network 102 to determine whether the node satisfies node-level threshold criteria indicating anomalous node operation may take various forms.

In a first implementation of evaluating the operation of a node in the manufacturing network 102, the data analytics platform 106 may use recent measurements of at least one select operating metric for each node in the manufacturing network 102 to determine a respective "critical state indicator" for each node, which is an indicator of the likelihood that a node is operating abnormally, and may then use the respective critical state indicators of the nodes in the manufacturing network 102 as the basis for determining whether the nodes are anomalous. This critical state indicator may take various forms, examples of which may include a binary indicator (e.g., a value of "0" or "1") or a probability value (e.g., a value ranging from 0 to 1). Further, the data analytics platform 106 may use the recent measurements of the at least one select operating metric to determine a respective critical state indicator for each node of the manufacturing network 102 in various manners.

In one implementation, the data analytics platform 106 may determine a respective critical state indicator for a given node by comparing the given node's most-recent one or more measurements of the select operating metric (e.g., the transmission delay time for the node, the extent of transmission losses for the node, the amount of bandwidth consumed by the node, the computer-resource utilization of the node, the extent of power failures and/or power interruptions at the node, etc.) to threshold criteria that defines whether the most-recent one or more measurements are considered to be abnormal. Based on this comparison, the data analytics platform 106 may (1) set the critical state indicator to a value of "1" if the given node's most-recent one or more measurements of the select operating metric satisfy the threshold criteria (e.g., if the most-recent measurement of the select operating metric falls above or below a threshold value) and (2) set the critical state indicator to a value of "0" if the given node's most-recent one or more measurements of the select operating metric do not satisfy the threshold criteria. In this respect, the threshold criteria may take various forms. As one example, the threshold criteria may be a fixed value that is specific to the select operating metric. As another example, the threshold criteria may be defined based on past measurements of the select operating metric for the given node. The threshold criteria may take other forms as well.

In an implementation where threshold criteria is defined based on past measurements of the select operating metric for the given node, such threshold criteria may be defined in various manners. As one possibility, the data analytics platform 106 may define the threshold criteria for a given node by applying an outlier detection technique such as a threshold that is calculated as a value that is beyond a multiple of interquartile range (IQR) from the third quartile measurement of a set of historical values of the given operating metric.

Such an IQR rule may cause the data analytics platform 106 to (1) determine a statistical dispersion between the seventy-fifth and twenty-fifth percentiles of the set of measurements, (2) subtract the first quartile of the set of measurements from the third quartile of the set of measurements, which defines the IQR for the set of measurements, (3) multiply the IQR by a desired factor (e.g., 1.5), and (4) add the resulting value to the third quartile of the set of measurements, which defines a maximum threshold for the set of measurements. In turn, the data analytics platform 106 may compare the given node's most-recent measurement of the select operating metric to this maximum threshold and then either (1) set the critical state indicator for the given node to a value of "1" if the given node's most-recent measurement of the select operating metric exceeds this maximum threshold or (2) set the critical state indicator for the given node to a value of "0" if the given node's most-recent measurement of the select operating metric does not exceed this maximum threshold.

Instead of comparing just the most-recent measurement of the select operating metric for the given node to the maximum threshold defined based on the IQR rule, the data analytics 106 may alternatively compare multiple recent measurements of the select operating metric for the given node to the maximum threshold defined based on the IQR rule. For instance, the data analytics 106 may first aggregate two or more recent measurements of the select operating metric for the given node (e.g., by taking the mean, median, mode, maximum, minimum, etc. of the two or more recent measurements), and may then compare the aggregated value to the maximum threshold defined based on the IQR rule.

The function of determining a respective critical state indicator for a given node in the manufacturing network 102 may take other forms as well. For instance, as noted above, the data analytics system 106 may set the critical state indicator for the given node to a probability value, rather than a binary indicator. In this respect, as one possible example, the data analytics system 106 may assign a critical state probability value to a given node based on how the most-recent one or more measurements of the select operating metric for the given node compares to the threshold criteria. In such an approach, a most-recent measurement of the select operating metric that is not close to satisfying the threshold criteria may result in a critical state probability value closer to 0, whereas a most-recent measurement of the select operating metric that goes well beyond the threshold criteria may result in a critical state probability value closer to 1.

Further, as noted above, the respective critical state indicator for each node may also be determined based on recent measurements for multiple operating metrics, rather than a single operating metric. For example, the data analytics system 106 may determine a respective critical state indicator for a given node by comparing the given node's most-recent measurement of each of multiple operating metrics to respective threshold criteria for such operating metrics.

Further yet, it is possible that the respective critical state indicator for a given node may be determined based on the recent measurements of an operating metric for both the given node and one or more other nodes in the manufacturing network 102 (e.g., child, sibling, or parent nodes). Other variations of the function of determining a respective critical state indicator for a given node in the manufacturing network 102 may exist as well.

After determining the respective critical state indicators for the nodes in the manufacturing network 102, the data analytics platform 106 may use such indicators as a basis for determining whether the nodes are anomalous. For example, if the respective critical state indicators take the form of binary indicators, the data analytics platform 106 may determine that a node having a critical state indicator of "1" is anomalous and a node having a critical state indicator of "0" is not anomalous. As another example, if the respective critical state indicators take the form of probability values, the data analytics platform 106 may compare a node's respective critical state probability to a probability threshold and determine whether or not the node is anomalous based on that comparison. Other examples are possible as well.

In a second implementation of evaluating the operation of a node in the manufacturing network 102 to determine whether a node satisfies node-level threshold criteria indicating anomalous node operation, the data analytics platform 106 may determine a respective "health score" for each node in the manufacturing network 102, which is a measure of the operating health of a node in the manufacturing network 102, and may then use the respective health scores as the basis for determining whether the nodes in the manufacturing network 102 are anomalous. In this respect, according to one implementation, the data analytics platform 106 may determine the respective health scores for the nodes in the manufacturing network 102 in a recursive manner, where the data analytics platform 106 begins by determining the respective health scores for the edge nodes in the manufacturing network 102 and then moves up the manufacturing network's topology level-by-level until the data analytics platform 106 reaches the root node 108. Such a recursive process for determining respective health scores for nodes in a manufacturing network is disclosed in U.S. patent application Ser. No. 15/910,361, which is incorporated by reference herein in its entirety. However, the data analytics platform 106 may determine the respective health scores for the nodes in the manufacturing network 102 in other manners as well.

After determining the respective health scores for the nodes in the manufacturing network 102, the data analytics platform 106 may use such health scores as a basis for determining whether the nodes are anomalous. For instance, the data analytics platform 106 may compare each node's respective health scores to a health score threshold that serves as a dividing line between health scores associated with normally operating nodes and health scores associated with anomalous nodes, where nodes having health scores that fall below the health score threshold are then are considered to be anomalous. In this respect, the health score threshold may take various forms.

In one example, the data analytics platform 106 may apply a single health score threshold to all nodes in the manufacturing network 102. In another example, the data analytics platform 106 may apply a different health score threshold to each different type of nodes (e.g., a first health score threshold for edge nodes 112, a second health score threshold for intermediate nodes 110, etc.). As yet another example, the data analytics platform 106 may apply a different health score threshold to each individual node in the manufacturing network 102. The health score threshold(s) applied by the data analytics platform 106 may take other forms as well.

In an implementation where the data analytics platform 106 is configured to apply a different health score threshold to each individual node in the manufacturing network 102, the respective health score threshold for each node may be defined in various manners. As one possibility, the data analytics platform 106 may define a respective health score threshold for a given node based on an evaluation of a recent set of health score determinations for the given node, such as the health score determinations that have been made for the given node over some recent period of time. For instance, the data analytics platform 106 may first apply an aggregation function a recent set of health score determinations for the given node, such as a function that determines a mean, median, mode, maximum, minimum, etc. of the recent set of health score determinations for the given node. In turn, the data analytics platform 106 may use the aggregated value resulting from this aggregating function (which may be referred to as a "baseline" health score for the given node) to set the respective health score threshold for the given node. For example, the data analytics platform 106 may set the respective health score threshold for the given node to be some amount below the "baseline" health score for the given node (e.g., one standard deviation). The data analytics platform 106 may define the respective health score threshold for the given node in other manners as well.

In a third implementation of evaluating the operation of a node in the manufacturing network 102 to determine whether a node satisfies node-level threshold criteria indicating anomalous operation, the data analytics platform 106 may use a node's respective critical state indicator, health score, or the like as the metric for evaluating whether the node was in an anomalous state at a given time, but instead of deeming a node anomalous based solely on whether the node's most-recent critical state indicator or health score satisfies threshold criteria that indicates anomalousness, the data analytics platform 106 may (1) evaluate an amount of time during a preceding window of time that the node's respective critical state indicator, health score, or the like indicates that the node was in an anomalous state and then (2) deem the node anomalous if that amount of time satisfies threshold criteria. That is, the data analytics platform 106 may identify a node as anomalous if the total length of the time period(s) that the node was in an anomalous state during the preceding window of time satisfies threshold criteria that defines whether the node is deemed anomalous. In this respect, the threshold criteria may be a threshold amount of time during which the node was in an anomalous state or a threshold percentage of time during which the node was in an anomalous state. In other implementations of this approach, the data analytics platform 106 may use a metric other than a node's respective critical state indicator or health score to evaluate whether the node was in an anomalous state at a given time.

Referring again to the above embodiment for evaluation the manufacturing network 102, the function of evaluating the extent of anomalous nodes in the manufacturing network 102 at a given time may also take various forms. In one implementation, the extent of anomalous nodes in the manufacturing network 102 may be measured in terms of the total number of nodes in the manufacturing network 102 that were anomalous at the given time. In such an implementation, the data analytics platform 106 may determine that there was a macro-network anomaly in the manufacturing network 102 at the given time if the total number of nodes in the manufacturing network 102 that were anomalous at the given time exceeds a threshold number of anomalous nodes, otherwise the data analytics platform 106 may consider the manufacturing network 102 to be operating normally (i.e., non-anomalously) at the given time.

In another implementation, the extent of anomalous nodes in the manufacturing network 102 may be measured in terms of a percentage of nodes in the manufacturing network 102 that were anomalous at the given time. In such an implementation, the data analytics platform 106 may determine that there was a macro-network anomaly in the manufacturing network 102 at the given time if the percentage of nodes in the manufacturing network 102 that were anomalous at the given time exceeds a threshold percentage of anomalous nodes, otherwise the data analytics platform 106 may consider the manufacturing network 102 to be operating normally (i.e., non-anomalously) at the given time.

The macro-level threshold criteria indicating anomalous operation of the manufacturing network 102 may take other forms as well.

To the extent that the data analytics platform 106 determines that there was a macro-network anomaly in the manufacturing network 102 at a given time, the data analytics platform 106 may then take various actions in response to such a determination. As one example, the data analytics platform 106 may cause a client station (e.g., client station 116) to present an alert indicating that a macro-network anomaly has been detected in the manufacturing network 102 at the given time. As another example, the data analytics platform 106 may responsively perform a more granular evaluation of the manufacturing network 102, by identifying a plurality of discrete segments of the manufacturing network 102 (e.g., a plurality of micro-networks, node paths, and/or individual nodes) and then evaluate each of the discrete segments for anomalous operation that may generally be referred to as a "segment-level anomaly." Such functionality is described in further detail below.

The data analytics platform 106 may take other actions in response to detecting a macro-network anomaly in the manufacturing network 102 as well such as surfacing lists of anomalous nodes and anomalous segments along with an alert that will in turn enable the manufacturing network personnel to reduce the time to diagnose the sub-par performance of the network. In another example, the data analytics platform 106 can restart the anomalous nodes. In yet another example, the data analytics platform 106 can isolate the anomalous nodes and request activation of redundant standby nodes to help self-healing of the network.

B. Monitoring Operation of a Micro-Network

In some implementations, the data analytics platform 106 may also be configured to identify a plurality of micro-networks in the manufacturing network 102, which are segments of the manufacturing network 102 that begin with a root node having at least two child nodes, and then evaluate each of the identified micro-networks (or at least a subset thereof) for anomalous operation that may be referred to as a "micro-network anomaly." For instance, in the context of the example manufacturing network 102 depicted in FIG. 1, the data analytics platform 106 may identify and evaluate (1) a first micro-network that includes node 110*a* as the "micro" root node and then nodes 112*a* and 112*b*; (2) a second micro-network that includes node 110*b* as the "micro" root node and then nodes 112*c*, 110*c*, 112*d*, and 112*e*; and (3) a third micro-network that includes node 110*c* as the "micro" root node and then nodes 112*d* and 112*e*. However, it should be understood that this example of micro-networks in a manufacturing network is merely provided for purposes of illustration.

In practice, the data analytics platform 106 may evaluate the manufacturing network 102 for micro-network anomalies at various times, such as periodically according to a schedule, each time the data analytics platform 106 receives new operating data for the manufacturing network 102, in response to a user request, in response to the detection of a macro-network anomaly in the manufacturing network 102, and/or in response to some other triggering event, among other possibilities. Further, in practice, the data analytics platform's evaluation of the manufacturing network 102 for micro-network anomalies may generally be based on operating data for the nodes in the identified micro-networks (e.g., a measure of transmission delays to and from the node in terms of delays in transmitting and receiving data and/or control packets, the extent of transmission loss for the node in terms of loss of data and/or control packets, the amount of bandwidth consumed by the node, the throughput and the computer-resource utilization of the node, the extent of power failures and/or power interruptions at the node, etc.) that is received from a source, such as the network-monitoring system 104. However, the data analytics platform's evaluation of the manufacturing network 102 for micro-network anomalies may take place at other times and/or be based on other types of data as well.

The data analytics platform's evaluation of the manufacturing network 102 for micro-network anomalies may take various forms. At a high level, this function may involve an evaluation of whether each identified micro-network in the manufacturing network 102 satisfies micro-network-level threshold criteria indicating a micro-network anomaly in the manufacturing network 102. Such an evaluation may take various forms.

In one embodiment, the data analytics platform's evaluation of whether a given micro-network satisfies micro-network-level threshold criteria indicating a micro-network anomaly at a given time may involve (1) evaluating the operation of each node in the given micro-network at the given time (e.g., based on operating data for each node) to determine whether any node in the micro-network satisfies node-level threshold criteria indicating anomalous node operation, (2) based on the evaluation, determining an extent of nodes in the given micro-network that were anomalous at the given time, and (3) if the extent of nodes in the given micro-network that were anomalous at the given time exceeds a threshold extent of anomalous nodes in the micro-network, determining that there was a micro-network anomaly in the given micro-network at the given time. The given time may be a given time instance or a given time interval.

In such an embodiment, the function of evaluating the operation of a node in a given-micro-network to determine whether the node satisfies node-level threshold criteria indicating anomalous node operation may take various forms. For instance, in line with the discussion above, the data analytics platform 106 may determine whether a node satisfies node-level threshold criteria indicating anomalous node operation based on an evaluation a critical state indicator and/or a recursively-determined health score for the node. This evaluation may take other forms as well.

Further, the function of evaluating the extent of anomalous nodes in a given micro-network at a given time may also take various forms. In one implementation, the extent of anomalous nodes in a given micro-network may be measured in terms of the total number of nodes in the given micro-network that were anomalous at the given time. In such an implementation, the data analytics platform 106 may determine that there was a micro-network anomaly in the given micro-network at the given time if the total number of nodes in the given micro-network that were anomalous at the given time exceeds a threshold number of anomalous nodes, otherwise the data analytics platform 106 may consider the given micro-network to be operating normally (i.e., non-anomalously) at the given time.

In another implementation, the extent of anomalous nodes in a given micro-network may be measured in terms of a percentage of nodes in the given micro-network that were anomalous at the given time. In such an implementation, the data analytics platform 106 may determine that there was a micro-network anomaly in the given micro-network at the given time if the percentage of nodes in the given micro-network that were anomalous at the given time exceeds a threshold percentage of anomalous nodes, otherwise the data analytics platform 106 may consider the given micro-network to be operating normally (i.e., non-anomalously) at the given time.

The micro-network-level threshold criteria indicating anomalous operation of a micro-network may take other forms as well.

To the extent that the data analytics platform 106 determines that there was a micro-network anomaly in the manufacturing network 102 at a given time, the data analytics platform 106 may then take various actions in response to such a determination. As one example, the data analytics platform 106 may cause a client station (e.g., client station 116) to present an alert indicating that a micro-network anomaly has been detected in the manufacturing network 102 at the given time. Such an alert may include various information about a detected micro-network anomaly, examples of which may include an identification of the nodes in each micro-network determined to be anomalous and/or an identification of the "micro" root node of each micro-network determined to be anomalous, which may be flagged as the possible root cause of the manufacturing network's anomalous operation. The alert may take other forms as well.

As another example, the data analytics platform 106 may responsively evaluate other aspects of the manufacturing network 102 that are related to each micro-network determined to be anomalous, such as node paths that run through each such micro-network and/or individual nodes in each such micro-network, to determine whether these other aspects of the manufacturing network 102 are anomalous.

As yet another example, the data analytics platform 106 may responsively send a command to the manufacturing network 102 that causes one or more nodes in an anomalous micro-network to be shutdown, disconnected, and/or otherwise isolated from the rest of the nodes in the manufacturing network 102.

The data analytics platform 106 may take other actions in response to detecting a micro-network anomaly in the manufacturing network 102 as well, such as restarting the anomalous nodes. In another example, the data analytics platform 106 can isolate the anomalous nodes and request activation of redundant standby nodes to help self-healing of the network.

C. Evaluating Operation of a Node Path

In some implementations, the data analytics platform 106 may also be configured to identify a plurality of node paths in the manufacturing network 102, which are segments of the manufacturing network 102 that comprises a shortest path between a node (e.g., an intermediate node 110 or an edge node 112) and either (1) the root node 108 of the manufacturing network or (2) another node (e.g., another intermediate node 110 or another edge node 112) in the manufacturing network 102.

For instance, in the context of the example manufacturing network 102 depicted in FIG. 1, the data analytics platform 106 may identify and evaluate the node path from each intermediate node 110 to the root node 108. As a specific example, one such node path may comprise the shortest path between intermediate node 110c and root node 108, which may include (1) root node 108, (2) intermediate node 110b, and (3) intermediate node 110c, where root node 108 may be considered the "head" node of the node path and the intermediate node 110c may be considered the "tail" node of the node path.

As another example, in the context of the example manufacturing network 102 depicted in FIG. 1, the data analytics platform 106 may identify and evaluate the node path between each intermediate node 110 and another intermediate node 110. As a specific example, one such node path may comprise the shortest path between intermediate node 110a and intermediate node 110c, which may include (1) intermediate node 110a, (2) root node 108, (3) intermediate node 110b, (4) and intermediate node 110c, where one of intermediate node 110a and intermediate node 110c is considered the "head" node of the path and the other of intermediate node 110a and intermediate node 110c is considered the "tail" node of the path.

In addition, the data analytics platform 106 may identify and evaluate the node path between each intermediate node 110 and each edge node 112. As a specific example, one such node path may comprise the shortest path between intermediate node 110a and edge node 112d, which may include (1) intermediate node 110a, (2) root node 108, (3) intermediate node 110b, (4) intermediate node 110c, and (5) edge node 112d, where one of intermediate node 110a and edge node 112d is considered the "head" node of the path and the other of intermediate node 110a and edge node 112d is considered the "tail" node of the path.

In one particular embodiment, the data analytics platform 106 may be configured to identify and monitor the operation of a plurality of "node paths" in the manufacturing network 102, which are segments of the manufacturing network 102 that comprise a shortest path between an edge node 112 in the manufacturing network 102 and either (1) the root node 108 of the manufacturing network 102 or (2) another edge node 112 in the manufacturing network 102, and then evaluate each of the identified node paths (or at least a subset thereof) for anomalous operation that may be referred to as an "node-path anomaly."

For instance, in the context of the example manufacturing network 102 depicted in FIG. 1, the data analytics platform 106 may identify and evaluate the node path from each edge node 112 to the root node 108. As a specific example, one such node path may comprise the shortest path between edge node 112d and root node 108, which may include (1) root node 108, (2) intermediate node 110b, (3) intermediate node 110c, and (4) edge node 112d, where root node 108 may be considered the "head" node of the path and the edge node 112d may be considered the "tail" node of the path.

In addition, in the context of the example manufacturing network 102 depicted in FIG. 1, the data analytics platform 106 may identify and evaluate the node path between each combination of two edge nodes 112. As a specific example, one such node path may comprise the shortest path between edge node 112c and edge node 112e, which may include (1) edge node 112c, (2) intermediate node 110b, (3) intermediate node 110c, and (4) edge node 112e, where one of edge node 112c and edge node 112e is considered the "head" node of the path and the other of edge node 112c and edge node 112e is considered the "tail" node of the path.

The data analytics platform 106 may determine each node path for each edge node 112 with respect to the root node 108 and with respect to every other edge node 112. For example, in the manufacturing network 102 depicted in FIG. 1, the data analytics platform 106 may determine each node path associated with edge node 112a. That is, the data analytics platform 106 may determine the node path between edge node 112a and root node 108, the node path between edge node 112a and edge node 112b, the node path between edge node 112a and edge node 112c, the node path between edge node 112a and edge node 112d, and the node path between edge node 112a and edge node 112e. The data analytics platform 106 may then determine each node path for or associated with edge node 112b, and so on.

In practice, the data analytics platform 106 may evaluate the manufacturing network 102 for node path (e.g., edge-node-path) anomalies at various times, such as periodically according to a schedule, each time the data analytics platform 106 receives new operating data for the manufacturing network 102, in response to a user request, in response to the detection of a macro-network anomaly in the manufacturing network 102, and/or in response to some other triggering event, among other possibilities. Further, in practice, the data analytics platform's evaluation of the manufacturing network 102 for node path anomalies may generally be based on operating data for the nodes in the identified node paths (e.g., a measure of transmission delays to and from the node in terms of delays in transmitting and receiving data and/or control packets, the extent of transmission loss for the node in terms of loss of data and/or control packets, the amount of bandwidth consumed by the node, the throughput and the computer-resource utilization of the node, the extent of power failures and/or power interruptions at the node, etc.) that is received from a source, such as the network-monitoring system 104. However, the data analytics platform's evaluation of the manufacturing network 102 for edge-node-path anomalies may take place at other times and/or be based on other types of data as well.

The data analytics platform's evaluation of the manufacturing network 102 for node-path anomalies may take various forms. At a high level, this function may involve an evaluation of whether each identified node path in the manufacturing network 102 satisfies path-level threshold criteria indicating a node-path anomaly in the manufacturing network 102. Such an evaluation may take various forms.

In one embodiment, the platform's evaluation of whether a given node path in the manufacturing network 102 satisfies path-level threshold criteria indicating a node-path anomaly at a given time may involve (1) evaluating the operation of each node in the given node path at the given time (e.g., based on operating data for each node) to determine whether any node in the node path satisfies node-level threshold criteria indicating anomalous node operation, (2) based on the evaluation, determining an extent of nodes in the given node path that were anomalous at the given time, and (3) if the extent of nodes in the given node path that were anomalous at the given time exceeds a threshold extent of anomalous nodes in the node path, determining that there was a micro-network anomaly in the given micro-network at the given time. The given time may be a given time instance or a given time interval.

In such an embodiment, the function of evaluating the operation of each node in a given node path (e.g., a node path) to determine whether the node satisfies node-level threshold criteria indicating anomalous node operation may take various forms. For instance, in line with the discussion above, the data analytics platform 106 may determine whether a node satisfies node-level threshold criteria indicating anomalous node operation based on an evaluation a critical state indicator and/or a recursively-determined health score for the node. This evaluation may take other forms as well.

Further, the function of evaluating the extent of anomalous nodes in a given node path (e.g., a node path) at a given time may also take various forms. In one implementation, the extent of anomalous nodes in a given node path may be measured in terms of the total number of nodes in the given node path that were anomalous at the given time. In such an implementation, the data analytics platform 106 may determine that there was a node-path anomaly in the given node path at the given time if the total number of nodes in the given node path that were anomalous at the given time exceeds a threshold number of anomalous nodes, otherwise the data analytics platform 106 may consider the given node path to be operating normally (i.e., non-anomalously) at the given time.

In another implementation, the extent of anomalous nodes in a given node path may be measured in terms of a percentage of nodes in the given node path that were anomalous at the given time. In such an implementation, the data analytics platform 106 may determine that there was a node-path anomaly in the given node path at the given time if the percentage of nodes in the given node path that were anomalous at the given time exceeds a threshold percentage of anomalous nodes, otherwise the data analytics platform 106 may consider the given node path to be operating normally (i.e., non-anomalously) at the given time.

The path-level threshold criteria indicating anomalous operation of a node path may take other forms as well.

To the extent that the data analytics platform 106 determines that there was a node-path anomaly in the manufacturing network 102 at a given time, the data analytics platform 106 may then take various actions in response to such a determination. As one example, the data analytics platform 106 may cause a client station (e.g., client station 116) to present an alert indicating that a node-path anomaly has been detected in the manufacturing network 102 at the given time. Such an alert may include various information about a detected node-path anomaly, examples of which may include an identification of the nodes in each node path determined to be anomalous and/or an identification of the head and/or tail node of each node path determined to be anomalous, which may be flagged as the possible root cause of the manufacturing network's anomalous operation. The alert may take other forms as well.

As another example, the data analytics platform 106 may responsively evaluate other aspects of the manufacturing network 102 that are related to each node path determined to be anomalous, such as micro-networks through which each such node path runs and/or individual nodes in each such node path, to determine whether these other aspects of the manufacturing network 102 are anomalous.

As yet another example, the data analytics platform 106 may responsively send a command to the manufacturing network 102 that causes one or more nodes in an anomalous node path to be shutdown, disconnected, and/or otherwise isolated from the rest of the nodes in the manufacturing network 102.

The data analytics platform 106 may take other actions in response to detecting a node-path anomaly in the manufacturing network 102 as well, such as restarting the anomalous nodes. In another example, the data analytics platform 106 can isolate the anomalous nodes and request activation of redundant standby nodes to help self-healing of the network.

D. Evaluating Operation of Individual Nodes

In some implementations, the data analytics platform 106 may also be configured to evaluate each of a plurality of individual nodes in the manufacturing network 102, which may include all nodes in the manufacturing network 102 or a certain subset of nodes, for anomalous operation that may be referred to as a "device anomaly." In some embodiments, the data analytics platform's evaluation of whether the manufacturing network 102 satisfies macro-network-level threshold criteria indicating a macro-network anomaly at a given time may involve evaluating the operation of each node in the manufacturing network 102 at a given time to determine whether any node in the manufacturing network is anomalous.

In practice, the data analytics platform 106 may evaluate the manufacturing network 102 for device anomalies at various times, such as periodically according to a schedule, each time the data analytics platform 106 receives new operating data for the manufacturing network 102, in response to a user request, in response to the detection of a macro-network anomaly in the manufacturing network 102, and/or in response to some other triggering event, among other possibilities. Further, in practice, the data analytics platform's evaluation of the manufacturing network 102 for device anomalies may generally be based on operating data for the plurality of nodes (e.g., a measure of transmission delays to and from the node in terms of delays in transmitting and receiving data and/or control packets, the extent of transmission loss for the node in terms of loss of data and/or control packets, the amount of bandwidth consumed by the node, the throughput and the computer-resource utilization of the node, the extent of power failures and/or power interruptions at the node, etc.) that is received from a source, such as the network-monitoring system 104. However, the data analytics platform's evaluation of the manufacturing network 102 for device anomalies may take place at other times and/or be based on other types of data as well.

The data analytics platform's evaluation of the manufacturing network 102 for device anomalies may take various forms. At a high level, this function may involve an evaluation of whether each node in the plurality of nodes satisfies node-level threshold criteria indicating a device anomaly in the manufacturing network 102. Such an evaluation may take various forms, including the approaches discussed above that are based on a critical state indicator and/or a recursively-determined health score for the node.

In one particular embodiment, the data analytics platform's evaluation of whether a given node in the manufacturing network 102 satisfies node-level threshold criteria indicating a device anomaly at a given time may involve (1) evaluating the amount of time during a preceding window of time that a node was in an anomalous state (e.g., based on a critical state indicator, health score, or the like) and then (2) if that amount of time satisfies threshold criteria, deeming the node anomalous. In this respect, the threshold criteria may be a threshold amount of time during which the node was in an anomalous state or a threshold percentage of time during which the node was in an anomalous state. In other implementations of this approach, the data analytics platform 106 may use a metric other than a node's respective critical state indicator or health score to evaluate whether the node was in an anomalous state at a given time.

To the extent that the data analytics platform 106 determines that there was a device anomaly in the manufacturing network 102 at a given time, the data analytics platform 106 may then take various actions in response to such a determination. As one example, the data analytics platform 106 may cause a client station (e.g., client station 116) to present an alert indicating that a device anomaly has been detected in the manufacturing network 102 at the given time. Such an alert may include various information about a detected device anomaly, such as an identification of the node(s) in determined to be anomalous. The alert may take other forms as well.

As another example, the data analytics platform 106 may responsively evaluate other aspects of the manufacturing network 102 that are related to each node determined to be anomalous, such as micro-networks and/or node paths of which the node is a part, to determine whether these other aspects of the manufacturing network 102 are anomalous. In other examples, the data analytics platform 106 may responsively evaluate other aspects of the manufacturing network 102 as a whole, such as one or more micro-networks and/or node paths of which the anomalous node is or is not a part, to determine whether these other aspects of the manufacturing network 102 are anomalous.

As yet another example, the data analytics platform 106 may responsively send a command to the manufacturing network 102 that causes one or more nodes in an anomalous node to be shutdown, disconnected, and/or otherwise isolated from the rest of the nodes in the manufacturing network 102.

The data analytics platform 106 may take other actions in response to detecting a device anomaly in the manufacturing network 102 as well, such as restarting the node. In another example, the data analytics platform 106 can isolate the anomalous node and request activation of redundant standby nodes to help self-healing of the network.

E. Example Process of Monitoring for Anomalies

An example process of monitoring a manufacturing network for anomalous operation in accordance with the present disclosure will now be described with reference to FIG. 6. For the purposes of illustration, the example functions are described in the context of the example system 100 illustrated in FIG. 1, and specifically in the context of the manufacturing network 102 being monitored by the data analytics platform 106. However, it should be understood that the example functions may be carried out in various other contexts as well. Likewise, it should be understood that the flow diagram in FIG. 6 is provided for sake of clarity and explanation and that numerous other combinations of functions may be utilized to monitor a manufacturing network for anomalous operation—including the possibility that example functions may be added, removed, rearranged into different orders, combined into fewer blocks, and/or separated into additional blocks depending upon the particular embodiment.

Figure 6:
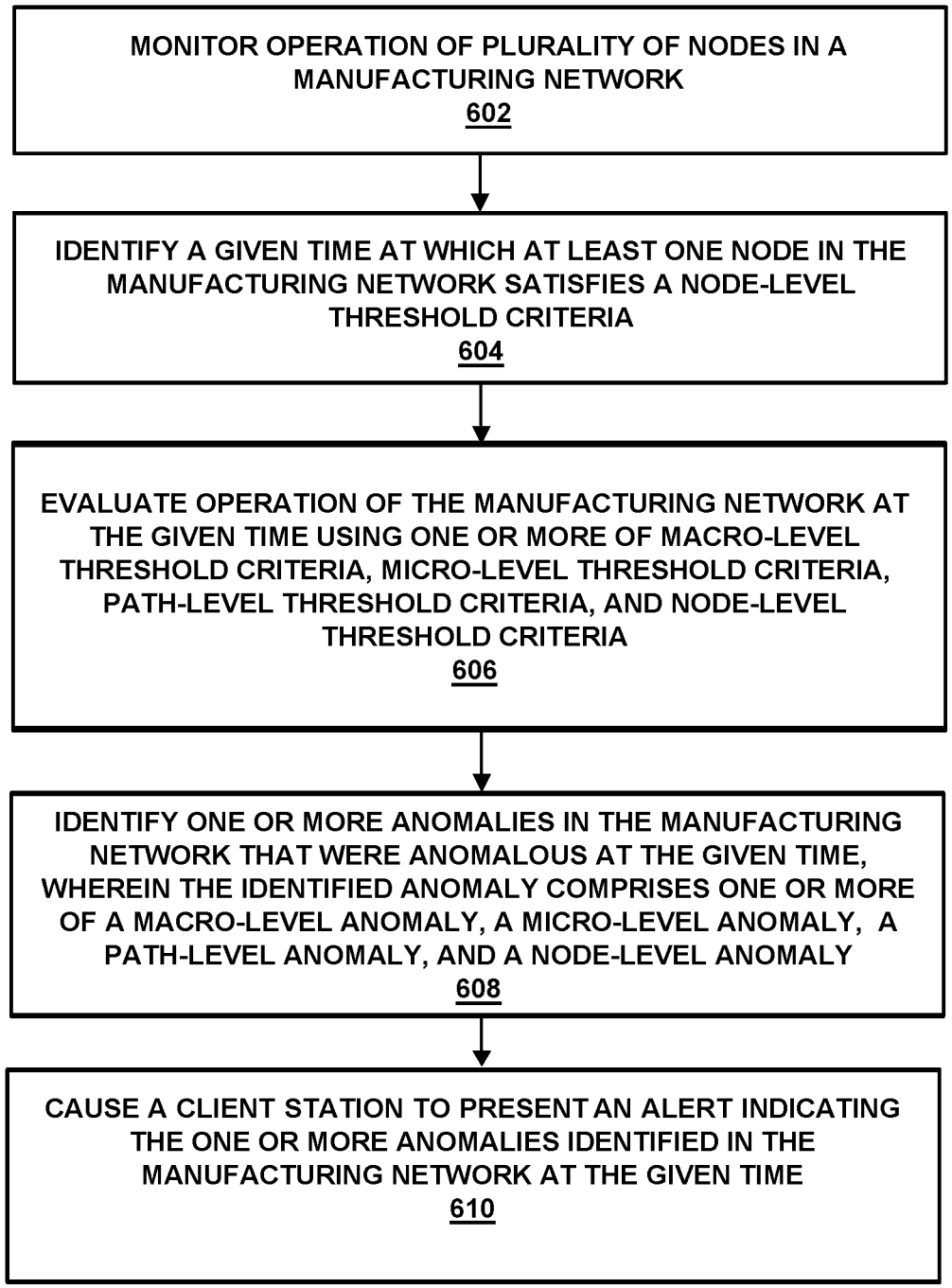
FIG. 6 is a flow diagram of example functions associated with monitoring the operation of a manufacturing network, identifying anomalies in the manufacturing network, and then reporting the identified anomalies.

At block 602 of FIG. 6, the data analytics platform 106 may monitor the operation of the plurality of nodes of the manufacturing network 102 for anomalies, such as device anomalies. In line with the discussion above, this monitoring function may involve evaluating the plurality of nodes in the manufacturing network 102 for anomalies at various times, such as periodically according to a schedule, each time the data analytics platform 106 receives new operating data for the manufacturing network 102, in response to a user request, and/or in response to some other triggering event, among other possibilities. Further, the data analytics platform's evaluation of the operation of the plurality of nodes in the manufacturing network 102 for anomalies may generally be based on operating data for the plurality of nodes in the manufacturing network 102 that is received from the network-monitoring system 104. However, the data analytics platform's evaluation of the operation of a plurality of nodes in the manufacturing network 102 for anomalies may take place at other times and/or be based on other types of data as well.

At block 604 of FIG. 6, while monitoring the operation of the manufacturing network 102, the data analytics platform 106 may identify a given time at which at least one node in the manufacturing network 102 satisfies node-level threshold criteria indicating anomalous operation of the node. The data analytics platform 106 may make this identification using any of the techniques described above, among other examples.

At block 606 of FIG. 6, in response to identifying the given time at which the at least one node of the manufacturing network 102 satisfies the node-level threshold criteria, the data analytics platform 106 may evaluate the operation of the manufacturing network 102 at the given time using one or more of (a) macro-level threshold criteria indicating anomalous operation of the manufacturing network as a whole, (b) micro-level threshold criteria indicating anomalous operation of any micro-network in the manufacturing network, (c) path-level threshold criteria indicating anomalous operation of any node path in the manufacturing network, and (d) node-level threshold criteria indicating anomalous operation of any one or more nodes in the manufacturing network. The data analytics platform 106 may carry out each of these evaluations using any of the techniques described above, among other examples.

At block 608 of FIG. 6, based on the evaluation at block 606, the data analytics platform 106 may identify at least one anomaly in the manufacturing network 102 at the given time. The identified at least one anomaly in the manufacturing network 102 may be a macro-level anomaly, a micro-level anomaly, a path-level anomaly, and/or a device anomaly. The data analytics platform 106 may make these identifications using any of the techniques described above, among other examples.

At block 610 of FIG. 6, in response to identifying one or more anomalies in the manufacturing network 102 at the given time, the data analytics platform 106 may cause a client station (e.g. client station 116) to present an alert indicating the one or more anomalies identified in the manufacturing network 102 at the given time. Such an alert may include various information about the identified one or more anomalies, examples of which may include an identification of one or more micro-networks and/or node paths determined to be anomalous, an identification of the nodes in each micro-networks and/or node paths determined to be anomalous, and/or an identification of a possible root cause of the identified one or more anomalies (e.g., a "micro" root node of a micro-network, or head and tail nodes of a node path), among other possibilities.

Once the client station 116 presents the alert indicating the one or more anomalies identified in the manufacturing network 102 at the given time, an individual responsible for overseeing the manufacturing network 102 may then use the alert to more identify and address the root cause of the manufacturing network's anomalous operation, which may provide several advantages, including a reduction in costly downtime of the manufacturing network 102.

In response to identifying one or more anomalies in the manufacturing network 102 that were anomalous at the given time, the data analytics platform 106 may take other actions as well. For example, the data analytics platform 106 may also send a command to the manufacturing network 102 that causes nodes in the identified one or more micro-networks or node path to be shutdown, disconnected, and/or otherwise isolated from the rest of the nodes in the manufacturing network 102. Other examples are possible as well, such as restarting the anomalous nodes. In another example, the data analytics platform 106 can isolate the anomalous nodes and request activation of redundant standby nodes to help self-healing of the network.

A further example process of monitoring a manufacturing network for anomalous operation in accordance with the present disclosure will now be described with reference to FIG. 7. At block 702 of FIG. 7, the data analytics platform 106 may monitor the manufacturing network 102 for macro-network anomalies. In line with the discussion above, this monitoring function may involve evaluating the manufacturing network 102 for macro-network anomalies at various times, such as periodically according to a schedule, each time the data analytics platform 106 receives new operating data for the manufacturing network 102, in response to a user request, and/or in response to some other triggering event, among other possibilities. Further, the data analytics platform's evaluation of the manufacturing network 102 for macro-network anomalies may generally be based on operating data for the manufacturing network 102 that is received from the network-monitoring system 104. However, the data analytics platform's evaluation of the manufacturing network 102 for macro-network anomalies may take place at other times and/or be based on other types of data as well.

Figure 7:
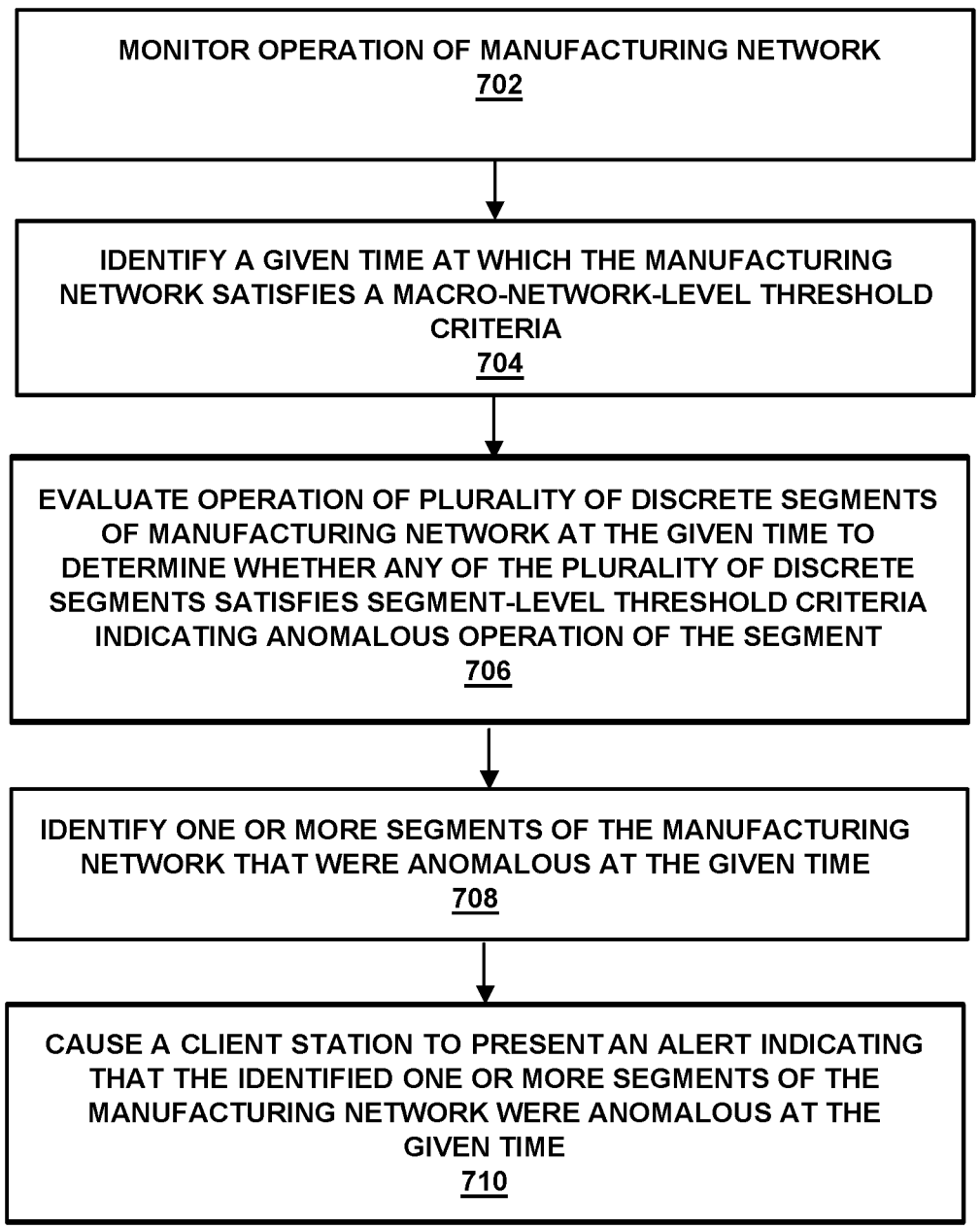
FIG. 7 is a flow diagram of additional example functions associated with monitoring the operation of a manufacturing network, identifying anomalies in the manufacturing network, and then reporting the identified anomalies.

At block 704 of FIG. 7, while monitoring the operation of the manufacturing network 102, the data analytics platform 106 may identify a given time at which the manufacturing network 102 satisfies macro-network-level threshold criteria indicating anomalous operation of the manufacturing network 102. The data analytics platform 106 may make this identification using any of the techniques described above, among other examples.

At block 706 of FIG. 7, in response to identifying the given time at which the manufacturing network 102 satisfies the macro-network threshold criteria, the data analytics platform 106 may evaluate the operation of a plurality of discrete segments of the manufacturing network 102 at the given time to determine whether any of the plurality of discrete segments of the manufacturing network 102 satisfies segment-level threshold criteria indicating anomalous operation of the segment.

For example, the data analytics platform 106 may evaluate the operation of a plurality of identified micro-networks in the manufacturing network 102 at the given time to determine whether any of the identified micro-networks satisfy micro-network-level threshold criteria indicating anomalous operation of the micro-network. The data analytics platform 106 may carry out this evaluation using any of the techniques described above, among other examples.

As another example, the data analytics platform 106 may evaluate the operation of a plurality of identified node paths in the manufacturing network 102 at the given time to determine whether any of the identified node paths (e.g., node paths) satisfy path-level threshold criteria indicating anomalous operation of the node path. The data analytics platform 106 may carry out this evaluation using any of the techniques described above, among other examples.

As yet another example, the data analytics platform 106 may evaluate the operation of a plurality of individual nodes in the manufacturing network 102 at the given time to determine whether any of the identified nodes satisfy node-level threshold criteria indicating anomalous operation of the node. The data analytics platform 106 may carry out this evaluation using any of the techniques described above, among other examples.

In practice, the data analytics platform 106 may be configured to evaluate one of these types of discrete segments of the manufacturing network at block 706, or may be configured to evaluate multiple types of discrete segments of the manufacturing network at block 706.

At block 708 of FIG. 7, based on the evaluation at block 706, the data analytics platform 106 may identify one or more segments of the manufacturing network 102 (e.g., one or more micro-networks, node paths, and/or individual nodes) that were anomalous at the given time. The data analytics platform 106 may make this identification using any of the techniques described above, among other examples.

At block 710 of FIG. 7, in response to identifying one or more segments of the manufacturing network 102 that were anomalous at the given time, the data analytics platform 106 may cause a client station (e.g. client station 116) to present an alert indicating that the identified one or more segments of the manufacturing network 102 were anomalous at the given time. Such an alert may include various information about the identified one or more anomalies, examples of which may include an identification of one or more segments determined to be anomalous, an identification of the nodes in each segment determined to be anomalous, and/or an identification of a possible root cause of the identified one or more anomalies (e.g., a "micro" root node of a micro-network, or head and tail nodes of a node path), among other possibilities.

Once the client station 116 presents the alert indicating that the identified one or more segments of the manufacturing network 102 were anomalous at the given time, an individual responsible for overseeing the manufacturing network 102 may then use the alert to more identify and address the root cause of the manufacturing network's anomalous operation, which may provide several advantages, including a reduction in costly downtime of the manufacturing network 102.

In response to identifying one or more segments of the manufacturing network 102 that were anomalous at the given time, the data analytics platform 106 may take other actions as well. For example, the data analytics platform 106 may also send a command to the manufacturing network 102 that causes nodes in the identified one or more segments to be shutdown, disconnected, and/or otherwise isolated from the rest of the nodes in the manufacturing network 102. Other examples are possible as well, such as restarting the anomalous nodes. In another example, the data analytics platform 106 can isolate the anomalous nodes and request activation of redundant standby nodes to help self-healing of the network.

While the disclosed processes, systems, and devices are described in the context of manufacturing networks, it should also be understood that disclosed processes, systems, and devices may be used to monitor the operation of and/or identify anomalies within any other type of data network that has similar characteristics to a manufacturing network (e.g., any data network that has a tree-like topology of nodes).

VI. CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided may not be the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

To the extent that examples described herein involve operations performed or initiated by actors, such as "humans", "operators", "users" or other entities, this is for purposes of example and explanation only. Moreover, the claims should not be construed as requiring action by such actors unless explicitly recited in the claim language.

What is claimed is:

1. A computing system comprising:
a network interface;
at least one processor;
a non-transitory computer-readable medium; and
program instructions stored on the non-transitory computer-readable medium that are executable by the at least one processor to cause the computing system to:
while monitoring operation of a manufacturing network having a topology that includes a plurality of edge nodes, a plurality of intermediate nodes, and a root node, evaluate the operation of the manufacturing network using at least two of (a) macro-level threshold criteria indicating anomalous operation of the manufacturing network as a whole, (b) micro-level threshold criteria indicating anomalous operation of any of a plurality of micro-networks in the manufacturing network, (c) path-level threshold criteria indicating anomalous operation of any of a plurality of node paths in the manufacturing network, or (d) node-level threshold criteria indicating anomalous operation of any of a plurality of individual nodes in the manufacturing network;
based on the evaluation, identify at least one anomaly in the manufacturing network; and
after identifying the at least one anomaly, trigger at least one action that is directed to resolving the at least one anomaly.

2. The computing system of claim 1, wherein the program instructions that are executable by the at least one processor to cause the computing system to trigger the at least one action comprise program instructions stored on the non-transitory computer-readable medium that are executable by the at least one processor to cause the computing system to (a) send a communication to a client station that causes the client station to present an alert indicating the identified at least one anomaly, (b) send a command to the manufacturing network that causes at least one node in the manufacturing network to be shutdown, disconnected, isolated, or restarted, or (c) send a command to the manufacturing network that causes activation of at least one standby node.

3. The computing system of claim 1, wherein the program instructions that are executable by the at least one processor to cause the computing system to evaluate the operation of the manufacturing network using at least two of (a) the macro-level threshold criteria, (b) the micro-level threshold criteria, (c) the path-level threshold criteria, or (d) the node-level threshold criteria comprise program instructions stored on the non-transitory computer-readable medium that are executable by the at least one processor to cause the computing system to:
evaluate the operation of the manufacturing network using first criteria that is selected from (a) the macro-level threshold criteria, (b) the micro-level threshold criteria, (c) the path-level threshold criteria, or (d) the node-level threshold criteria;
based on the evaluation of the operation of the manufacturing network using the first criteria, make a determination that the operation of the manufacturing network satisfies the first criteria at a given time; and
in response to the determination, evaluate the operation of the manufacturing network at the given time using at least second criteria that is selected from (a) the macro-level threshold criteria, (b) the micro-level threshold criteria, (c) the path-level threshold criteria, or (d) the node-level threshold criteria, wherein the second criteria differs from the first criteria.

4. The computing system of claim 3, wherein the first criteria comprises the node-level threshold criteria, and wherein the at least second criteria comprises at least one of (a) the macro-level threshold criteria, (b) the micro-level threshold criteria, or (c) the path-level threshold criteria.

5. The computing system of claim 3, wherein the first criteria comprises the macro-level threshold criteria, and wherein the at least second criteria comprises at least one of (a) the micro-level threshold criteria, (b) the path-level threshold criteria, or (c) the node-level threshold criteria.

6. The computing system of claim 1, wherein the program instructions that are executable by the at least one processor to cause the computing system to identify the at least one anomaly in the manufacturing network based on the evaluation comprises program instructions stored on the non-transitory computer-readable medium that are executable by the at least one processor to cause the computing system to:
based on the evaluation, identify one of (a) an anomalous macro network, (b) at least one anomalous micro network in the manufacturing network, (c) at least one anomalous node path in the manufacturing network, or
(d) at least one anomalous individual node in the manufacturing network.

7. The computing system of claim 1, wherein the program instructions that are executable by the at least one processor to cause the computing system to evaluate the operation of the manufacturing network using the macro-level threshold criteria comprise program instructions stored on the non-transitory computer-readable medium that are executable by the at least one processor to cause the computing system to:
- determine a respective health score for each node in the manufacturing network at or before a given time using a recursive process that determines respective health scores for nodes in the manufacturing network on a topology level-by-level basis starting with the plurality of edge nodes of the manufacturing network and ending with the root node of the manufacturing network;
- use the respective health scores for the nodes in the manufacturing network at or before the given time as a basis for determining an extent of nodes in the manufacturing network as a whole that are anomalous at the given time; and
- determine whether the extent of nodes in the manufacturing network that are anomalous at the given time exceeds a threshold extent of anomalous nodes in a manufacturing network.

8. The computing system of claim 1, wherein the program instructions that are executable by the at least one processor to cause the computing system to evaluate the operation of the manufacturing network using the micro-level threshold criteria comprise program instructions stored on the non-transitory computer-readable medium that are executable by the at least one processor to cause the computing system to perform the following functions for each respective micro network of the plurality of micro networks of the manufacturing network:
- determine a respective health score for each node in the respective micro network at or before a given time using a recursive process that determines respective health scores for nodes in the manufacturing network on a topology level-by-level basis starting with the plurality of edge nodes of the manufacturing network and ending with the root node of the manufacturing network;
- use the respective health scores for the nodes in the respective micro network at or before the given time as a basis for determining an extent of nodes in the respective micro network that are anomalous at the given time; and
- determine whether the extent of nodes in the respective micro network that are anomalous at the given time exceeds a threshold extent of anomalous nodes in a micro network.

9. The computing system of claim 1, wherein the program instructions that are executable by the at least one processor to cause the computing system to evaluate the operation of the manufacturing network using the path-level threshold criteria comprise program instructions stored on the non-transitory computer-readable medium that are executable by the at least one processor to cause the computing system to perform the following functions for each respective node path of the plurality of node paths of the manufacturing network:
- determine a respective health score for each node in the respective node path at or before a given time using a recursive process that determines respective health scores for nodes in the manufacturing network on a topology level-by-level basis starting with the plurality of edge nodes of the manufacturing network and ending with the root node of the manufacturing network;
- use the respective health scores for the nodes in the respective node path at or before the given time as a basis for determining an extent of nodes in the respective node path that are anomalous at the given time; and
- determine whether the extent of nodes in the respective node path that are anomalous at the given time exceeds a threshold extent of anomalous nodes in a node path.

10. The computing system of claim 1, wherein the program instructions that are executable by the at least one processor to cause the computing system to evaluate the operation of the manufacturing network using the node-level threshold criteria comprise program instructions stored on the non-transitory computer-readable medium that are executable by the at least one processor to cause the computing system to perform the following functions for each respective node of the plurality of individual nodes of the manufacturing network:
- determine a respective health score for the respective node at or before a given time using a recursive process that determines respective health scores for nodes in the manufacturing network on a topology level-by-level basis starting with the plurality of edge nodes of the manufacturing network and ending with the root node of the manufacturing network; and
- use the respective health score for the respective node at or before the given time as a basis for determining whether the respective node was anomalous at the given time.

11. The computing system of claim 10, wherein the program instructions that are executable by the at least one processor to cause the computing system to use the respective health score for the respective node at or before the given time as a basis for determining whether the respective node was anomalous at the given time comprise program instructions stored on the non-transitory computer-readable medium that are executable by the at least one processor to cause the computing system to:
- evaluate whether the respective health score for the respective node at the given time is below a health-score threshold that is defined based on a set of health scores for the respective node at times prior to the given time.

12. The computing system of claim 10, wherein the program instructions that are executable by the at least one processor to cause the computing system to use the respective health score for the respective node at or before the given time as a basis for determining whether the respective node was anomalous at the given time comprise program instructions stored on the non-transitory computer-readable medium that are executable by the at least one processor to cause the computing system to:
- determine an extent of a given window of time preceding the given time during which the respective health score of the respective node was below a health-score threshold; and
- evaluate whether the determined extent is above a threshold extent.

13. The computing system of claim 1, wherein the at least one anomaly comprises an anomalous micro network having a micro-network root node, and wherein the computing system further comprises program instructions stored on the non-transitory computer-readable medium that are executable by the at least one processor to cause the computing system to:

identify the micro-network root node of the anomalous micro network as a potential root cause of the at least one anomaly.

14. The computing system of claim 1, wherein the at least one anomaly comprises an anomalous node path having a given head node and a given tail node, and wherein the computing system further comprises program instructions stored on the non-transitory computer-readable medium that are executable by the at least one processor to cause the computing system to:
identify one or both of the given head node or the given tail node of the anomalous node path as a potential root cause of the at least one anomaly.

15. A computer-implemented method comprising:
while monitoring operation of a manufacturing network having a topology that includes a plurality of edge nodes, a plurality of intermediate nodes, and a root node, evaluating the operation of the manufacturing network using at least two of (a) macro-level threshold criteria indicating anomalous operation of the manufacturing network as a whole, (b) micro-level threshold criteria indicating anomalous operation of any of a plurality of micro-networks in the manufacturing network, (c) path-level threshold criteria indicating anomalous operation of any of a plurality of node paths in the manufacturing network, or (d) node-level threshold criteria indicating anomalous operation of any of a plurality of individual nodes in the manufacturing network;
based on the evaluating, identifying at least one anomaly in the manufacturing network; and
after identifying the at least one anomaly, triggering at least one action that is directed to resolving the at least one anomaly.

16. The computer-implemented method of claim 15, wherein triggering the at least one action comprises one of (a) sending a communication to a client station that causes the client station to present an alert indicating the identified at least one anomaly, (b) sending a command to the manufacturing network that causes at least one node in the manufacturing network to be shutdown, disconnected, isolated, or restarted, or (c) sending a command to the manufacturing network that causes activation of at least one standby node.

17. The computer-implemented method of claim 16, wherein evaluating the operation of the manufacturing network using at least two of (a) the macro-level threshold criteria, (b) the micro-level threshold criteria, (c) the path-level threshold criteria, or (d) the node-level threshold criteria comprises:
evaluating the operation of the manufacturing network using first criteria that is selected from (a) the macro-level threshold criteria, (b) the micro-level threshold criteria, (c) the path-level threshold criteria, or (d) the node-level threshold criteria;
based on the evaluating of the operation of the manufacturing network using the first criteria, determining that the operation of the manufacturing network satisfies the first criteria at a given time; and
in response to the determining, evaluating the operation of the manufacturing network at the given time using at least second criteria that is selected from (a) the macro-level threshold criteria, (b) the micro-level threshold criteria, (c) the path-level threshold criteria, or (d) the node-level threshold criteria, wherein the second criteria differs from the first criteria.

18. The computer-implemented method of claim 17, wherein the first criteria comprises the node-level threshold criteria, and wherein the at least second criteria comprises at least one of (a) the macro-level threshold criteria, (b) the micro-level threshold criteria, or (c) the path-level threshold criteria.

19. The computer-implemented method of claim 17, wherein the first criteria comprises the macro-level threshold criteria, and wherein the at least second criteria comprises at least one of (a) the micro-level threshold criteria, (b) the path-level threshold criteria, or (c) the node-level threshold criteria.

20. A non-transitory computer-readable storage medium, wherein the non-transitory computer-readable storage medium is provisioned with software that is executable to cause a computing system to perform functions including:
while monitoring operation of a manufacturing network having a topology that includes a plurality of edge nodes, a plurality of intermediate nodes, and a root node, evaluating the operation of the manufacturing network using at least two of (a) macro-level threshold criteria indicating anomalous operation of the manufacturing network as a whole, (b) micro-level threshold criteria indicating anomalous operation of any of a plurality of micro-networks in the manufacturing network, (c) path-level threshold criteria indicating anomalous operation of any of a plurality of node paths in the manufacturing network, or (d) node-level threshold criteria indicating anomalous operation of any of a plurality of individual nodes in the manufacturing network;
based on the evaluating, identifying at least one anomaly in the manufacturing network; and
after identifying the at least one anomaly, triggering at least one action that is directed to resolving the at least one anomaly.

* * * * *